(12) United States Patent
Lee et al.

(10) Patent No.: US 10,531,475 B2
(45) Date of Patent: Jan. 7, 2020

(54) COMMUNICATION METHOD ON BASIS OF SEMI-PERSISTENT SCHEDULING IN WIRELESS COMMUNICATION SYSTEM

(71) Applicant: Samsung Electronics Co., Ltd., Gyeonggi-do (KR)

(72) Inventors: Nam-Jeong Lee, Suwon-si (KR); Peng Xue, Suwon-si (KR); Cheol Jeong, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/504,303

(22) PCT Filed: Jun. 22, 2016

(86) PCT No.: PCT/KR2016/006617
§ 371 (c)(1),
(2) Date: Feb. 15, 2017

(87) PCT Pub. No.: WO2016/208962
PCT Pub. Date: Dec. 29, 2016

(65) Prior Publication Data
US 2018/0184439 A1    Jun. 28, 2018

Related U.S. Application Data

(60) Provisional application No. 62/182,732, filed on Jun. 22, 2015.

(51) Int. Cl.
*H04W 72/12* (2009.01)
*H04W 72/04* (2009.01)
(Continued)

(52) U.S. Cl.
CPC ....... *H04W 72/12* (2013.01); *H04W 72/0413* (2013.01); *H04W 74/0833* (2013.01); *H04W 88/02* (2013.01); *H04W 88/08* (2013.01)

(58) Field of Classification Search
CPC ............. H04W 72/12; H04W 72/0413; H04W 74/0833
See application file for complete search history.

(56) References Cited

U.S. PATENT DOCUMENTS 8,555,126 B2  10/2013 Löhr et al.
2008/0031128 A1* 2/2008 Jang .................... H04W 74/004
370/210
(Continued)

FOREIGN PATENT DOCUMENTS

WO  2013-131264 A1  9/2013
WO  2013-140240 A1  9/2013

OTHER PUBLICATIONS

The International Searching Authority, "International Search Report," International Application No. PCT/KR2016/006617, dated Sep. 21, 2016, 3 pages, publisher the ISA/KR, International Application Division, Korean Intellectual Property Office, Daejeon, Republic of Korea.
(Continued)

*Primary Examiner* — Jael M Ulysse

(57) ABSTRACT

The present invention relates to a 5G or pre-5G communication system for supporting higher data transmission rates than 4G communication systems such as LTE. The present invention provides a communication method of a terminal which communicates with a base station in a wireless communication system, the communication method comprising the motions of: transmitting, to the base station, a first random access request message comprising identification information of the terminal; receiving, as a response to the first random access request message, a response message comprising semi-persistent scheduling (SPS) terminal identity (ID) and uplink (UL) resource allocation information; and periodically transmitting, using the SPS terminal ID, UL data from a resource that is indicated by the UL resource (Continued)

allocation information, wherein the identification information of the terminal is information that indicates that the terminal will be appointed as an SPS terminal.

14 Claims, 26 Drawing Sheets

(51) Int. Cl.
  *H04W 74/08* (2009.01)
  *H04W 88/02* (2009.01)
  *H04W 88/08* (2009.01)

(56) References Cited

U.S. PATENT DOCUMENTS

| | | | | |
|---|---|---|---|---|
| 2008/0146242 A1* | 6/2008 | Alanara | H04W 72/0413 | 455/452.1 |
| 2009/0197610 A1* | 8/2009 | Chun | H04W 72/1284 | 455/450 |
| 2010/0002630 A1* | 1/2010 | Park | H04L 1/1812 | 370/328 |
| 2010/0034161 A1* | 2/2010 | Luo | H04B 1/707 | 370/329 |
| 2010/0067495 A1* | 3/2010 | Lee | H04W 74/008 | 370/335 |
| 2010/0081443 A1* | 4/2010 | Meyer | H04L 1/1812 | 455/450 |
| 2010/0232335 A1* | 9/2010 | Lee | H04W 72/005 | 370/312 |
| 2010/0255852 A1* | 10/2010 | Chen | H04W 72/082 | 455/450 |
| 2011/0261763 A1* | 10/2011 | Chun | H04W 74/008 | 370/329 |
| 2012/0069805 A1* | 3/2012 | Feuersanger | H04W 72/1284 | 370/329 |
| 2012/0140638 A1* | 6/2012 | Zhao | H04L 5/001 | 370/241 |
| 2012/0147830 A1* | 6/2012 | Lohr | H04W 72/042 | 370/329 |
| 2012/0202544 A1* | 8/2012 | Kim | H04W 52/146 | 455/509 |
| 2012/0300752 A1* | 11/2012 | Kwon | H04W 56/0005 | 370/336 |
| 2013/0083739 A1* | 4/2013 | Yamada | H04W 74/006 | 370/329 |
| 2013/0142140 A1* | 6/2013 | Tseng | H04W 72/042 | 370/329 |
| 2013/0163536 A1* | 6/2013 | Anderson | H04W 72/1284 | 370/329 |
| 2013/0201977 A1* | 8/2013 | Agiwal | H04W 72/04 | 370/336 |
| 2013/0215807 A1* | 8/2013 | Yang | H04L 1/0026 | 370/281 |
| 2013/0301582 A1* | 11/2013 | Jiang | H04W 72/042 | 370/329 |
| 2013/0315114 A1* | 11/2013 | Seo | H04L 5/001 | 370/280 |
| 2014/0029586 A1* | 1/2014 | Loehr | H04W 56/0005 | 370/336 |
| 2014/0233538 A1* | 8/2014 | Zhang | H04W 72/1205 | 370/336 |
| 2014/0307695 A1* | 10/2014 | Yang | H04L 1/18 | 370/329 |
| 2015/0071198 A1* | 3/2015 | Deng | H04W 74/006 | 370/329 |
| 2015/0105119 A1* | 4/2015 | Eriksson | H04W 52/146 | 455/522 |
| 2015/0271791 A1* | 9/2015 | Webb | H04W 4/70 | 370/230 |
| 2016/0087772 A1* | 3/2016 | Yang | H04L 1/1825 | 370/329 |

OTHER PUBLICATIONS

Intel Corporation, "Impacts on random access procedure for Release-13 low complexity UEs and enhanced coverage," R2-152162, May 16, 2015, 3GPP TSG RAN WG2 Meeting #90, Fukuoka, Japan, May 25-29, 2015, 8 pages.

3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification," (Release 12), Technical Specification, Mar. 27, 2015, 447 pages.

* cited by examiner

COMMUNICATION METHOD ON BASIS OF SEMI-PERSISTENT SCHEDULING IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2016/006617 filed Jun. 22, 2016, entitled "COMMUNICATION METHOD ON BASIS OF SEMI-PERSISTENT SCHEDULLING IN WIRELESS COMMUNICATION SYSTEM", and claims priority to U.S. provisional patent application no. 62/182,732, filed on Jun. 22, 2015, which are incorporated herein by reference into the present disclosure as if fully set forth herein.

TECHNICAL FIELD

The present disclosure relates to base station-UE communication schemes applying semi-permanent scheduling (SPS) to some users, which may apply to machine-to-machine communication systems, e.g., cellular Internet of things (CIoT) systems.

BACKGROUND ART

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Recently under research is such technology as machine-type communication (MTC) equipping all things and sensors with communication functionality so that they can intelligently gather and mutually transfer information. Machine-to-machine (M2M) communication or Internet-of-things (IoT) is also termed in the same meaning as MTC.

As communication techniques to implement MTC, short-range communication schemes and remote communication schemes may come into use. Short-range communication schemes for MTC include small coverage communication schemes, such as Bluetooth (or Bluetooth Low Energy (BLE)), near-field communication (NFC), or Wireless-Fidelity (Wi-Fi). The remote communication technology for MTC encompasses broad-coverage CIoT techniques. As CIoT technology for configuring cells to embody the IoT, there are standardized techniques, such as 3rd generation partnership project (3GPP) GSM EDGE radio access network (GERAN) CIoT, 3GPP long term evolution (LTE) Enhanced-MTC, 3GPP LTE narrow band IoT (NB-IoT) and non-standardized techniques, such as SIGFOX, On-Ramp, or Weightless. The 3GPP New RAT (NR) study item presently under discussion for standardization are also in progress for standardization of massive-MTC (mMTC) scenarios, as a CIoT technology, and 3GPP Rel-14 is scheduled to proceed with enhanced narrowband-IoT (eNB-IoT).

Although different from application to application, information exchanged between devices on the cellular-based MTC is generally small in size (i.e., the inter-MTC device data rate is low) and is relatively infrequently subject to communication (i.e., a low duty cycle), and is relatively less sensitive to latency.

Further, a major CIoT, i.e., metering (e.g., water supply metering, rainfall metering, or gas metering) mostly involves periodic uplink (UL) communication. For reference, the working assumption of the GERAN CIoT study item assumes that 80% of UE UL traffic are for periodic reporting.

MTC devices performing periodic communication may predict the period of data UL transmission. Accordingly, such a process may be redundant and unnecessary that periodically communicative MTC devices perform random access (RA) and receive UL grants at each UL transmission.

DETAILED DESCRIPTION OF THE INVENTION

Technical Problem

The present disclosure proposes a base station-UE communication scheme of a system, which performs semi-permanent scheduling (hereinafter, 'SPS') on some users (user devices) in a CIoT system.

Further, the present disclosure proposes a base station-UE connecting operation, an SPS configuration operation, an SPS resource reconfiguration operation, an operation for UL transmission in addition to resources for the SPS, and a SPS release operation.

Technical Solution

The present disclosure proposes a method for communication by a user equipment (UE) with a base station in a wireless communication system, comprising transmitting a first random access request message including identification information of the UE to the base station, receiving a response message including a semi-permanent scheduling (SPS) UE identity (ID) and uplink (UL) resource allocation information in response to the first random access request message, and transmitting UL data periodically in a resource indicated by the UL resource allocation information using the SPS UE ID, wherein the identification information of the UE comprises information indicating that the UE is to be designated as a SPS UE.

The present disclosure proposes a method for communication by a base station with a user equipment (UE) in a wireless communication system, comprising receiving a first random access request message including identification information of the UE, transmitting a response message including a semi-permanent scheduling (SPS) UE identity (ID) and uplink (UL) resource allocation information in response to the first random access request message, and receiving UL data periodically in a resource indicated by the UL resource allocation information using the SPS UE ID, wherein the identification information of the UE is information indicating that the UE is to be designated as an SPS UE.

The present disclosure proposes a user equipment (UE) communicating with a base station in a wireless communication system, comprising a controller controlling a transceiver to transmit a first random access request message including identification information of the UE to the base station, receive a response message including a semi-permanent scheduling (SPS) UE identity (ID) and uplink (UL) resource allocation information in response to the first random access request message, and transmit UL data periodically in a resource indicated by the UL resource allocation information using the SPS UE ID and the transceiver transmitting or receiving at least one of the message and the information under a control of the controller, wherein the identification information of the UE comprises information indicating that the UE is to be designated as a SPS UE.

The present disclosure proposes a base station communicating with a user equipment (UE) in a wireless communication system, comprising a controller controlling a transceiver to receive a first random access request message including identification information of the UE, transmit a response message including a semi-permanent scheduling (SPS) UE identity (ID) and uplink (UL) resource allocation information in response to the first random access request message, and receive UL data periodically in a resource indicated by the UL resource allocation information using the SPS UE ID and the transceiver transmitting or receiving at least one of the message and the information under a control of the controller, wherein the identification information of the UE comprises information indicating that the UE is to be designated as a SPS UE.

Effects of the Invention

The present disclosure may reduce the RA by the MTC device performing UL data transmission periodically and in the same size by performing the SPS on the MTC device. The reduction in the RA may lead to a reduction in RA overhead, which may diminish inter-UE collision or contention on the random access channel (RACH). The reduced RA and collision on the RA may result in power saving in low-power CIoT devices.

MODE FOR CARRYING OUT THE INVENTION

Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The base station is an entity communicating with a UE and may be denoted BS, nodeB (NB), eNodeB (eNB), or access point (AP).

The user equipment is an entity communicating with the base station, and particularly in this disclosure, the user equipment may indicate one performing the MTC or CIoT. The user equipment may also be denoted a mobile station (MS), mobile equipment (ME), device, or terminal.

In this disclosure, the term 'SPS UE' means a UE for which UL transmission resources are semi-permanently scheduled. In this disclosure, thus, 'performing SPS' means 'performing semi-permanent scheduling,' SPSed' means 'semi-permanently scheduled,' SPS resource' means an 'SPSed resource,' SPS communication' means communication using a SPS resource, and 'SPS transmission' means 'transmission using an SPS resource.'

Figure 1:
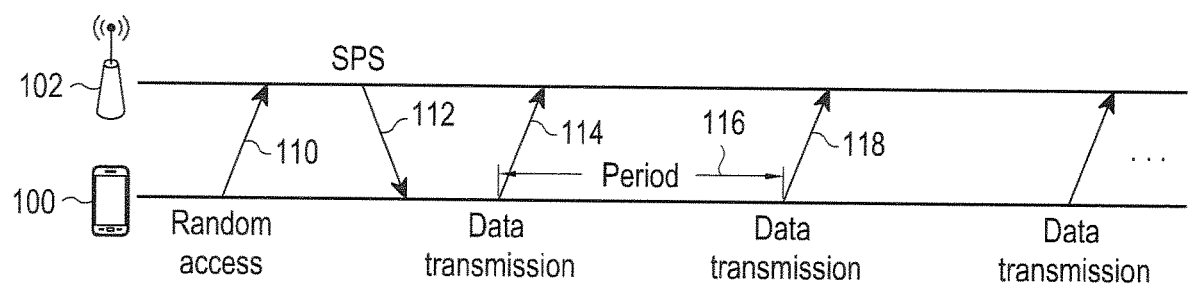
FIG. 1 is a view illustrating an example of a procedure to which the SPS applies in base station-UE communication in a cellular communication system.

FIG. 1 is a view illustrating an example of a procedure to which the SPS applies in base station-UE communication in a cellular communication system.

The UE 100 intending to perform UL transmission to the base station 102 attempts random access 110 to the base station 102. The base station 102 may perform SPS 112 on the UE 100 succeeding in the random access 110. The UE 100 may perform UL data transmission 114 using an SPSed resource, and after a predetermined period 116, may perform UL data transmission 118. That is, the UE 100 may perform periodic UL data transmission using the SPSed resource.

The UE may perform UL data transmission through the SPS resource (i.e., the SPSed resource) using an identity (ID) for identifying the UE. At this time, IDs available to the UE may include an 'SPS UE ID' and a 'UE unique ID.'

The 'SPS UE ID' is an ID of the UE assigned by the base station, valid (only) within the cell covered by the base station, and assigned to the UE using the SPS resource. An example of the SPS UE ID is an SPS cell radio network temporary identity (SPS-C-RNTI).

The 'UE unique ID' is a unique ID for uniquely identifying the UE, e.g., a temporary logical link identity (TLLI) or an SAE-temporary mobile subscriber identity (S-TMSI).

Where the UE uses the 'SPS UE ID' for SPS communication, a group of SPS UE IDs valid within the cell may be designated. The SPS UE ID group may be designated based on a scheme in which all available IDs are shared by non-SPS UEs and SPS UEs or a scheme in which all available IDs are divided into an ID group available to non-SPS UEs and an ID group available to SPS UEs (example 1: all available IDs=000 to 111, IDs available to non-SPS UEs=000 to 011, and IDs available to SPS UEs=100 to 111).

For SPS communication, the UE may send a random access request message to request to designate the 'SPS UE ID.' The random access request message may contain a random number or random sequence (or RA sequence). Here, the random number and the random sequence are information for identifying the UE, which are included in the random access request message. The random number is information for identifying the type of the message, and the random sequence is information (e.g., Zadoff-Chu sequence) for identifying the sequence type.

At this time, the random number or random sequence may be selected from a pool shared by a UE requesting to designate an SPS resource (i.e., an SPS requesting UE) and a UE not requesting to designate an SPS resource (i.e., a non-SPS requesting UE) or may be selected from each of separate pools respectively for the non-SPS requesting UE and the SPS requesting UE. Where the pool for the SPS requesting UE is distinct from the pool for the non-SPS requesting UE, the base station would be able to recognize that the received random access request is a request for performing SPS simply by receiving the random number or random sequence selected from the pool for the SPS requesting UE.

Base Station-UE Connection and Designation of SPS Interval

For the UE to perform UL data transmission to the base station, the UE performs a procedure including the transmission and reception of random access messages with the base station—i.e., a 'connection' procedure. The designation of the 'SPS UE' may be triggered by the UE during the course of the connection (i.e., a UE trigger scheme) or may be triggered by the base station (i.e., a base station trigger scheme).

A method in which the designation of the 'SPS UE' in the connection procedure is triggered by the UE is described with reference to FIGS. 2 to 4.

Figure 2:
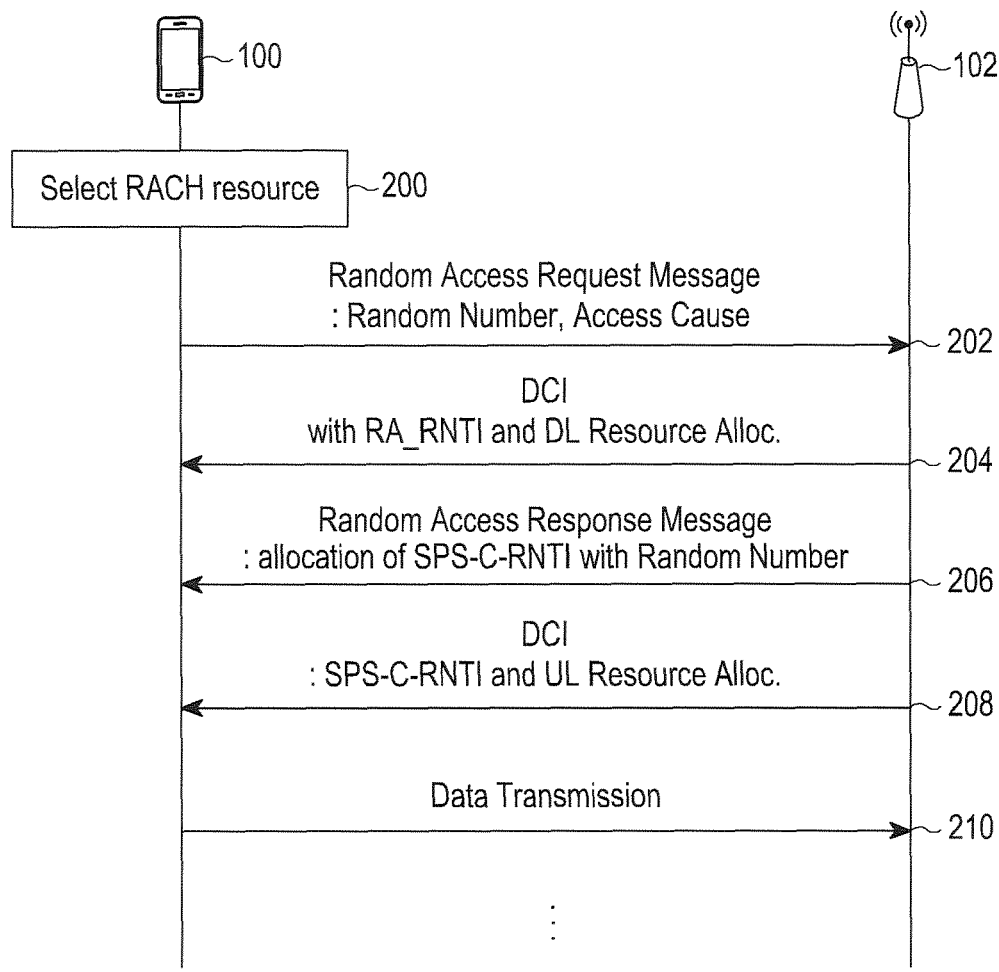
FIG. 2 is a view illustrating an example of a method in which an SPS UE ID is used when a UE triggers a designation of an SPS UE according to the present disclosure.

FIG. 2 is a view illustrating an example of a method in which an SPS UE ID is used when a UE triggers a designation of an SPS UE according to the present disclosure.

In FIG. 2, in order to notify the base station of SPS transmission, the UE may include a random number for SPS transmission in a random access request message or include the random number and an access cause indicating the SPS request in the random access request message and transmit the same.

The UE 100 may select a RACH resource for transmission of the random access request message (200).

The UE 100 may transmit the random access request message to the base station 102 using the selected RACH resource (202). The random access request message may include the random number. For example, where a group of random numbers available only to the SPS UE is determined, the UE 100 may select one random number from the random number group available only to the SPS UE, include the selected random number in the random access request message, and send the same. Alternatively, the random access request message may contain a random number and an access cause. For example, upon initial attachment for the UE 100 to perform SPS communication, the UE 100 may include an access cause (i.e., SPS_request) indicating the designation of the SPS UE in the random access request message, thereby requesting the base station 102 to authorize the UE 100 as an SPS UE.

Table 1 illustrates an example of the configuration of the random access request message according to the present disclosure.

TABLE 1

| Field | Description |
| --- | --- |
| Type | Random access format type(i.e., with random number or with C-RNTI/SPS-C-RNTI for special case) |
| MS Identity | Random Number or C-RNTI/SPS-C-RNTI |
| BSR | Buffer status report: Level of uplink data(in bytes) buffered in the MS |
| Start Indicator | Start Position of the RACH Allocation |
| Access Cause | Random access cause |

Referring to Table 1 above, it can be seen that, according to the present disclosure, the random access request message has been designed to accommodate the SPS-C-RNTI, which is an SPS UE ID, as the identity of the UE. In the UE trigger-scheme connection operation, the SPS-transmitted payload size, as buffer status report (BSR) information, may be sent from the UE to the base station.

In response to the random access request message 202, the base station 102 may transmit downlink control information including a random access-RNTI (RA-RNTI) and downlink (DL) resource allocation information to the UE 100 (204).

When the random access request transmitted from the UE 100 succeeds, the base station 102 may assign the SPS-C-RNTI to the UE 100 and transfer the same through a random access response message (206). The random access response message may further include the random number transmitted from the UE 100.

Table 2 illustrates an example of the configuration of the random access response message according to the present disclosure.

TABLE 2

| Field | Description |
| --- | --- |
| Type | Set to 0 to indicate a Random Access Response message |
| Random Number | Random Number |
| C-RNTI or SPS-C-RNTI | Cell Radio Network Temporary Identity or SPS-C-RNTI |
| Start Indicator | Start Position of the RACH Allocation |
| SPS Interval | SPS Interval for UE with SPS-C-RNTI |

Subsequently, the base station 102 may transmit, to the UE 100, a DCI including an SPS-C-RNTI and UL resource allocation information for SPS transmission (208).

Table 3 illustrates an example of the configuration of a control channel according to the present disclosure.

TABLE 3

| Field | Description |
| --- | --- |
| DL Number | The number of scheduled downlink users. |
| DL Allocation[ ] | List of DL Allocations. One for each scheduled transmission. Included in this field: RNTI (C-RNTI, P-RNTI, RA-RNTI or SPS-C-RNTI) Channel ID MCS Start indicator Duration PDU identification |
| UL Number | The number of scheduled uplink users. |
| UL Allocation | List of UL Allocations. One for each scheduled uplink user. Included in this field: C-RNTI or SPS-C-RNTI Channel ID MCS Start indicator Duration Acknowledgement information Bitmap ACK index: indicate the position of the corresponding ACK/NACK indication in the bitmap ACK field of the DCI following the UL allocation |
| RACH Number | The number of scheduled random access resources. |
| RACH Config [ ] | List of RACH configs. One for each scheduled random access resource. Included in this field: MCS Channel ID Start indicator SZ: Number of slots of RACH: $2^{SZ}$ * RACH Allocation Unit |
| Bitmap ACK field | The bitmap ACK field for the UL transmissions which are ended between the previous DCI and this DCI |
| Previous bitmap ACK field | A repetition of the bitmap ACK field in the previous DCI |
| Padding | A variable length padding field. The length of the field will be |

TABLE 3-continued

| Field | Description |
|---|---|
| | set so that the payload is a whole number of octets and the following CRC begins on an octet boundary. |

Then, the UE 100 may perform SPS transmission through the UL resource for SPS transmission (210).

Here, the DE 100 may designate an interval of the SPS transmission, i.e., an SPS interval and transfer the SPS interval to the base station 102. Information about the SPS interval may be included, as separate information, in the random access request message 202, may be indicated by the SPS interval indicator corresponding to some of the bits constituting the random number included in the random access request message 202 (e.g., the last two bits in the random number indicate the SPS interval), or may be included in the SPS-transmitted (210) data.

The SPS interval transmitted from the UE 100 may be verified by the base station 102. For example, where the SPS interval indicator corresponding to some of the constituent bits of the random number indicates the information about the SPS interval, the SPS interval indicator confirm, which is some bits of the SPS-C-RNTI in the random access response message transmitted from the base station 102, may indicate whether to confirm or reject on the SPS interval indicator, or the conformation or rejection on the SPS interval indicator may also be indicated by the DCI 208.

Meanwhile, the base station 102 may reject the request for designating as the 'SPS UE' from the UE 100. For example, where no or insufficient SPS UE IDs (i.e., the SPS-C-RNTI) are left despite the reception of the request to designate as SPS UE from the UE 100, the base station 102 may reject the request to designate as SPS UE from the UE 100. Schemes for the base station 102 to reject the request to designate as 'SPS UE' may include the first scheme of transmitting, not the SPS-C-RNTI but, the C-RNTI in the DCI 208 where the C-RNTI and SPS-C-RNTI group are used separately from each other, the second scheme of transferring a reject indicator in the random access response message 206, and the third scheme of indicating the rejection through the SPS interval indicator confirm which is some of the SPS-C-RNTI bits in the random access response message 206.

Figure 3:
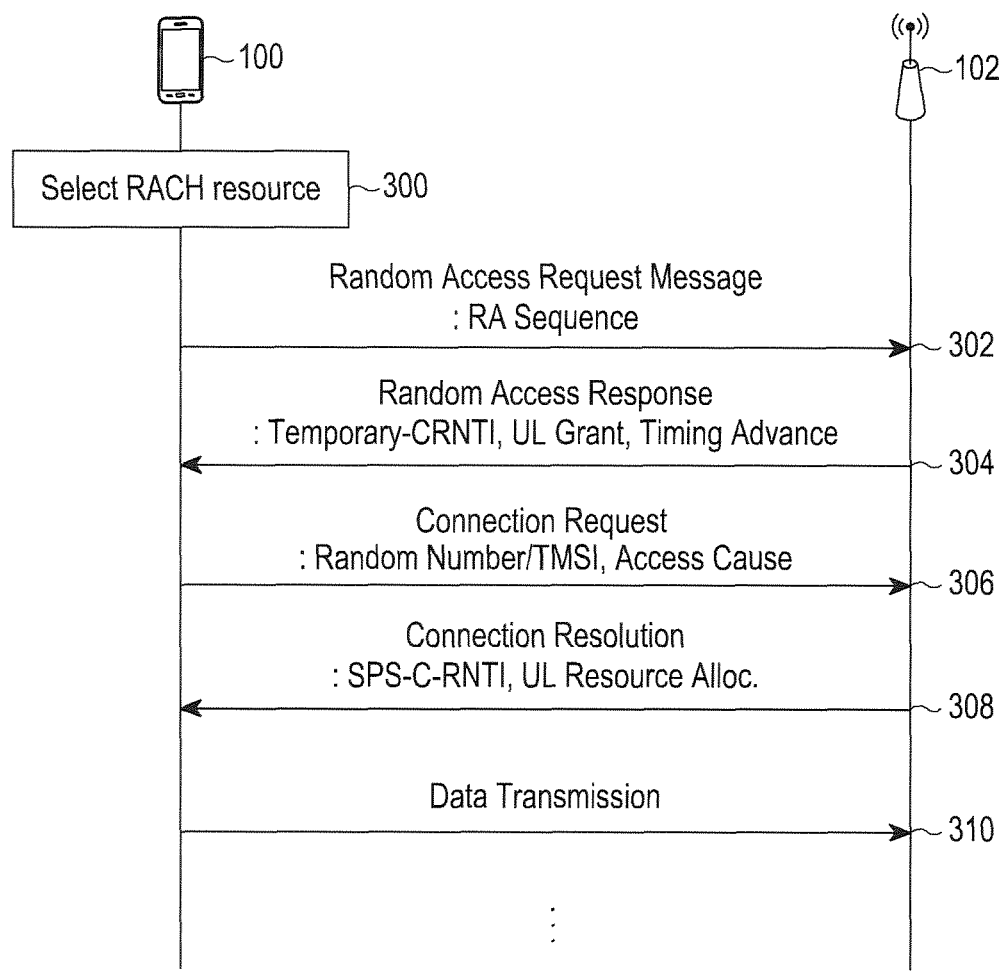
FIG. 3 is a view illustrating an example of another method in which an SPS UE ID is used when a UE triggers a designation of an SPS UE according to the present disclosure.

FIG. 3 is a view illustrating an example of another method in which an SPS UE ID is used when a UE triggers a designation of an SPS UE according to the present disclosure.

In FIG. 3, in order to notify the base station of SPS transmission, the UE includes a random sequence for the SPS transmission in a random access request message, includes the random number in a connection request message, or includes the random number and an access cause (indicating an SPS request) therein and transmit the same.

The UE 100 may select a RACH resource for transmission of the random access request message (300).

The UE 100 may transmit the random access request message to the base station 102 using the selected RACH resource (302). The random access request message may include the random sequence. For example, where a group of random sequences available only to the SPS UE is determined, the UE 100 may, without the access cause, select one random sequence from the random sequence group available only to the SPS UE, include the selected random number in the random access request message, and send the same.

The SPS-transmitted payload size in the UE trigger-schemed connection operation may be transmitted, as BSR information, from the UE 100 to the base station 102.

In response to the random access request message 302, the base station 102 may transmit, to the UE 100, a random access response message containing a temporary-C-RNTI, a UL grant, and timing advance information (304).

The UE 100 may transmit, to the base station 102, a connection request message containing a random number or TMSI (306). The connection request message 306 may further include an access cause.

In response to the connection request message 306, the base station 102 may transmit a contention resolution message to the UE 100 (308). The contention resolution message may contain the SPS-C-RNTI, an SPS UE ID, and may contain UL resource allocation information that the UE 100 is to use upon SPS transmission. Or, the contention resolution message 308 may not include the SPS-C-RNTI but only the random number or TMSI that the UE 100 transmitted in step 306. At this time, the UE 100 may use, as the SPS-C-RNTI, the temporary C-RNTI included in the random access response message 304. To that end, the contention resolution message 308 may include a one-bit indicator indicating whether the UE 100 has been authorized as SPS UE or rejected. That is, if the UE 100 is indicated as having been rejected as SPS UE, the UE 100 may utilize, as the SPS-C-RNTI, the temporary C-RNTI assigned in step 306. The contention resolution message 308 may be transmitted on a physical downlink shared channel (PDSCH).

The UE 100 may perform SPS transmission of UL data using the SPS-C-RNTI and the UL resource allocation information (310).

Here, the UE 100 may designate the interval of SPS transmission, i.e., SPS interval, and transfer the SPS interval to the base station 102. Information about the SPS interval may be indicated by the group of random sequences transferred in the random access request message 202 (e.g., the SPS interval is implicitly assigned per group where the random sequence belongs), may be included in the UL data SPS-transmitted (310), or may be transmitted in the connection request message 306 that the UE 100 sends.

Meanwhile, the base station 102 may reject the request for designating as the 'SPS UE' from the UE 100. For example, where no or insufficient SPS UE IDs are left despite the reception of the request to designate as SPS UE from the UE 100, the base station 102 may reject the request to designate as SPS UE from the UE 100. Schemes for the base station 102 to reject the request to designate as 'SPS UE' may include the first scheme of transmitting, not the SPS-C-RNTI but, the C-RNTI where the C-RNTI and SPS-C-RNTI group are used separately from each other, the second scheme of transferring a reject indicator in the random access response message, and the third scheme of indicating the rejection through the SPS interval indicator confirm which is some of the SPS-C-RNTI bits in the contention resolution message 308.

Figure 4:
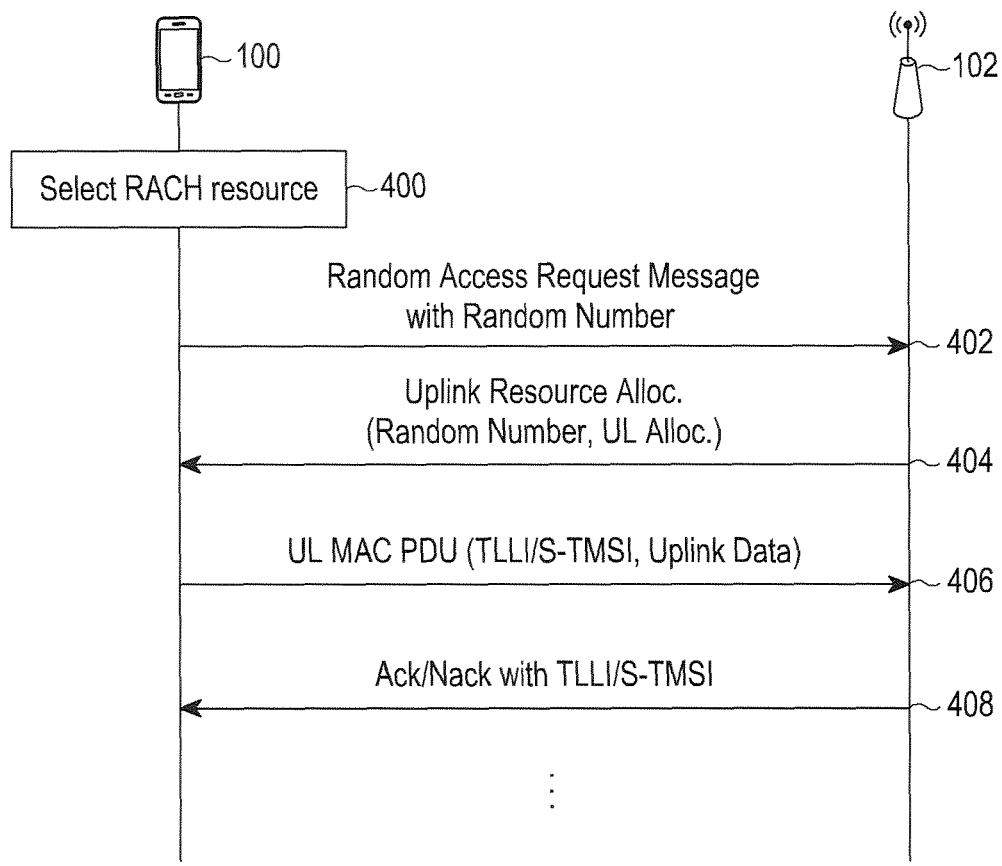
FIG. 4 is a view illustrating an example of a method in which a unique ID is used when a UE triggers a designation of an SPS UE according to the present disclosure.

FIG. 4 is a view illustrating an example of a method in which a unique ID is used when a UE triggers a designation of an SPS UE according to the present disclosure.

In FIG. 4, in order to notify the base station of SPS transmission, the UE includes a random number for SPS transmission in a random access request message or an access cause for requesting the SPS transmission in the random access request message or includes an indicator indicating the SPS transmission in a UL media access control (UL MAC) protocol data unit (PDU) and sends the same.

The UE 100 may select a RACH resource for transmission of the random access request message (400).

The UE 100 may transmit the random access request message to the base station 102 using the selected RACH resource (402). The random access request message may include the random number. For example, where a group of random numbers available only to the SPS UE is determined, the UE 100 may select one random number from the random number group available only to the SPS UE, include the selected random number in the random access request message, and send the same. Alternatively, the random access request message may contain a random number and an access cause. For example, upon initial attachment, the UE 100 intending SPS transmission may include an access cause (i.e., SPS_request) indicating the designation of the SPS UE in the random access request message, thereby requesting the base station 102 to authorize the UE 100 as an SPS UE. The SPS-transmitted payload size in the UE trigger-schemed connection operation may be transmitted, as BSR information, from the UE 100 to the base station 102.

In response to the random access request message 402, the base station 102 may transmit, to the UE 100, a DCI containing UL resource allocation information for SPS transmission and the random number (404).

The UE 100 may transmit the MAC PDU of the UL data using the UL resource allocation information (406). The MAC PDU of the UL data may contain the unique ID (TLLI or S-TMSI) of the UE 100. Here, the unique ID of the UE 100 is used as a UE ID for SPS transmission. That is, the unique ED plays a role as the SPS-C-RNTI. The MAC PDU may include a one-bit indicator indicating the SPS transmission.

Upon receiving the UL MAC PDU, the base station 102 may transmit an ACK or NACK signal containing the unique ID to the UE 100 (408).

Here, the UE 100 may designate an SPS interval and transfer the SPS interval to the base station 102. Information about the SPS interval may be included, as separate information, in the random access request message 402, may be indicated by the SPS interval indicator corresponding to some of the bits constituting the random number included in the random access request message 402 (e.g., the last two bits in the random number indicate the SPS interval), or may be included in the SPS-transmitted UL MAC PDU 406.

Meanwhile, the base station 102 may reject the request for designating as the 'SPS UE' from the UE 100. For example, where no or insufficient SPS UE IDs (i.e., the SPS-C-RNTI) are left despite the reception of the request to designate as SPS UE from the UE 100, the base station 102 may reject the request to designate as SPS UE from the UE 100. Schemes for the base station 102 to reject the request to designate as 'SPS UE' include the scheme of including an indicator indicating a 'reject' in the DCI that is transmitted in response to the random access request message.

A method in which the designation of the 'SPS UE' in the connection procedure is triggered by the base station is described with reference to FIGS. 5 to 8.

Figure 5:
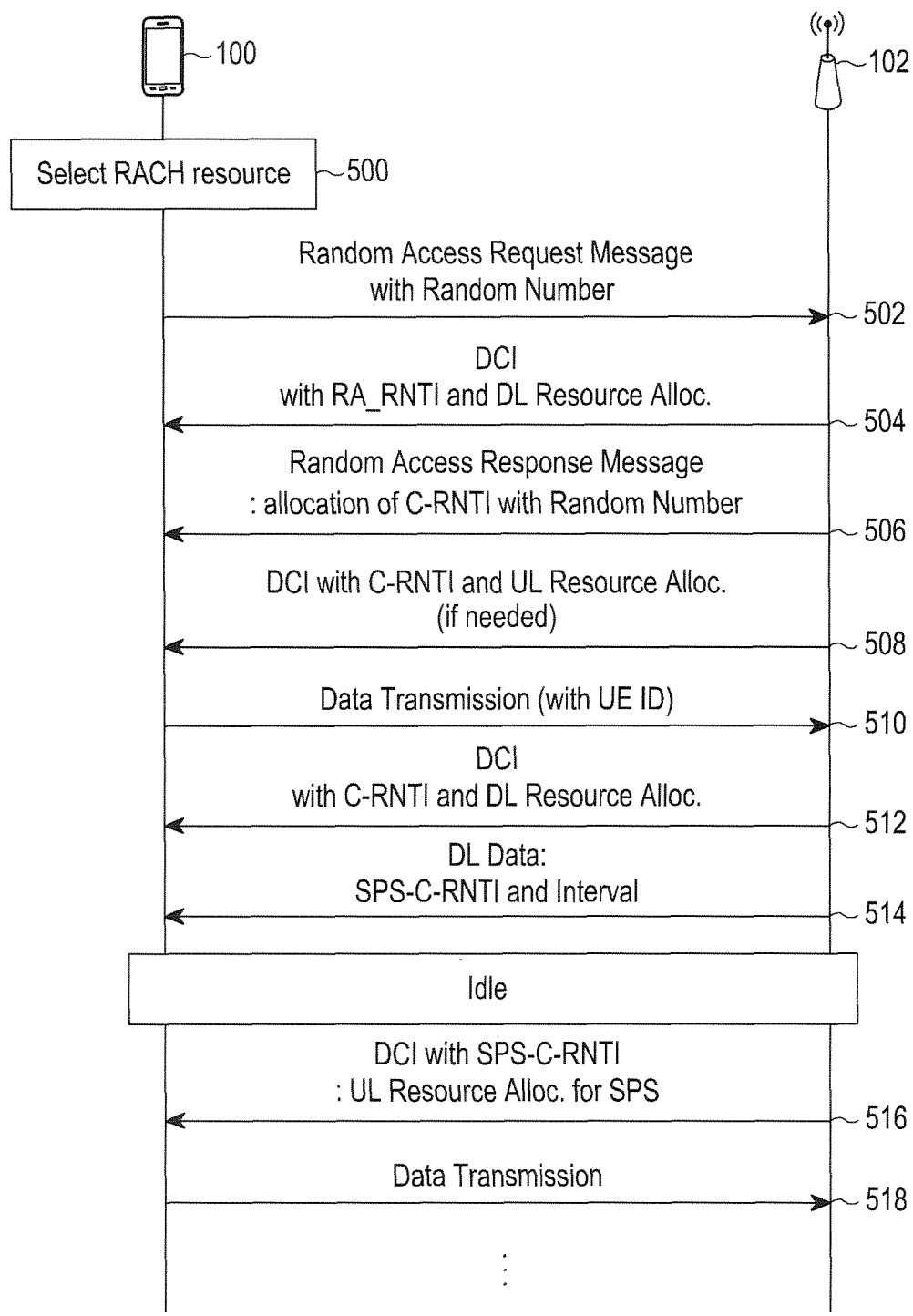
FIG. 5 is a view illustrating an example of a method in which an SPS UE ID is used when a base station triggers a designation of an SPS UE according to the present disclosure.

FIG. 5 is a view illustrating an example of a method in which an SPS UE ID is used when a base station triggers a designation of an SPS UE according to the present disclosure.

In FIG. 5, the base station determines whether to designate the UE as SPS UE based on the UE ID contained in the UL data upon first UL data transmission after the UE's initial attachment.

The UE 100 may select a RACH resource for transmission of the random access request message (500).

The UE 100 may transmit the random access request message to the base station 102 using the selected RACH resource (502). The random access request message may include the random number.

In response to the random access request message 502, the base station 102 may transmit, to the UE 100, a DCI containing DL resource allocation information and RA-RNTI (504).

When the random access request transmitted from the UE 100 succeeds, the base station 102 may assign the C-RNTI to the UE 100 and transfer the same through a random access response message (506). The random access response message may further include the random number transmitted from the UE 100.

Subsequently, the base station 102 may transmit, to the UE 100, a DCI including a C-RNTI and UL resource allocation information for UL data transmission (508).

The UE 100 may perform UL data transmission using the UL resource allocation information (510).

Then, the base station 102 may determine whether to designate the UE 100 as SPS UE based on the UE ID contained in the UL data 510. For example, the base station 102 may designate the UE 100 as SPS UE considering such conditions as 1) whether periodic UL transmission has been conducted by the UE 100; or 2) whether the UE has not been subject to adjustment of the timing advance (TA) value for a long time, with periodic UL transmission steadily performed by the UE 100. Condition 2) above applies for the reason that it is more efficient to designate a UE as SPS UE if the UE so lacks mobility as to render TA adjustment unnecessary in the system that TA is of significance.

If the base station 102 designates the UE 100 as SPS UE, the base station may perform SPS configuration. The SPS configuration may include the operation 512 of transmitting a DCI containing the C-RNTI and the DL resource allocation information for DL data transmission and the operation 514 of transmitting the SPS-C-RNTI, as DL data, through the allocated DL resource.

Such information as information about the SPS interval and the first SPS transmission time, as well as the SPS-C-RNTI assigned may be transmitted through the DL data 514 that is transmitted upon SPS configuration. Designation of the payload size and UL resource allocation for substantive SPS transmission are performed prior to (516) the first SPS transmission time 518. The time 516 at which the UL resource for SPS transmission is allocated may become the start point of next SPS transmission as per the definition of the SPS interval. The designation of the SPS interval will be described below.

In FIG. 5, schemes available to indicate that the UE 100 is designated as SPS UE include: 1) the scheme of including a one-bit indicator in the DL data 514 transmitted upon SPS configuration and allocating the SPS-C-RNTI; 2) the scheme of including a one-bit indicator in the DL data 514 transmitted upon SPS configuration and setting the currently assigned C-RNTI to be used as the SPS-C-RNTI; or 3) the scheme of configuring an SPS-C-RNTI group distinct from the C-RNTI and designating an SPS-C-RNTI in the SPS-C-RNTI group in the DL data 514 in the SPS UE.

FIG. 5 exemplifies message-type transmission in which the random number is included in the random access request message 502. Sequence-type transmission in which the random sequence is contained in the initial random access request message may be performed similar to the operations exemplified in FIG. 3. That is, if the random sequence is transmitted in the random access request message 502, operations 504 to 510 in FIG. 5 may be replaced with operations 304 to 310 in FIG. 3. However, the contention resolution message 308 to be transmitted in FIG. 5 would be of the type in which the C-RNTI is included instead of the SPS-C-RNTI.

Figure 6:
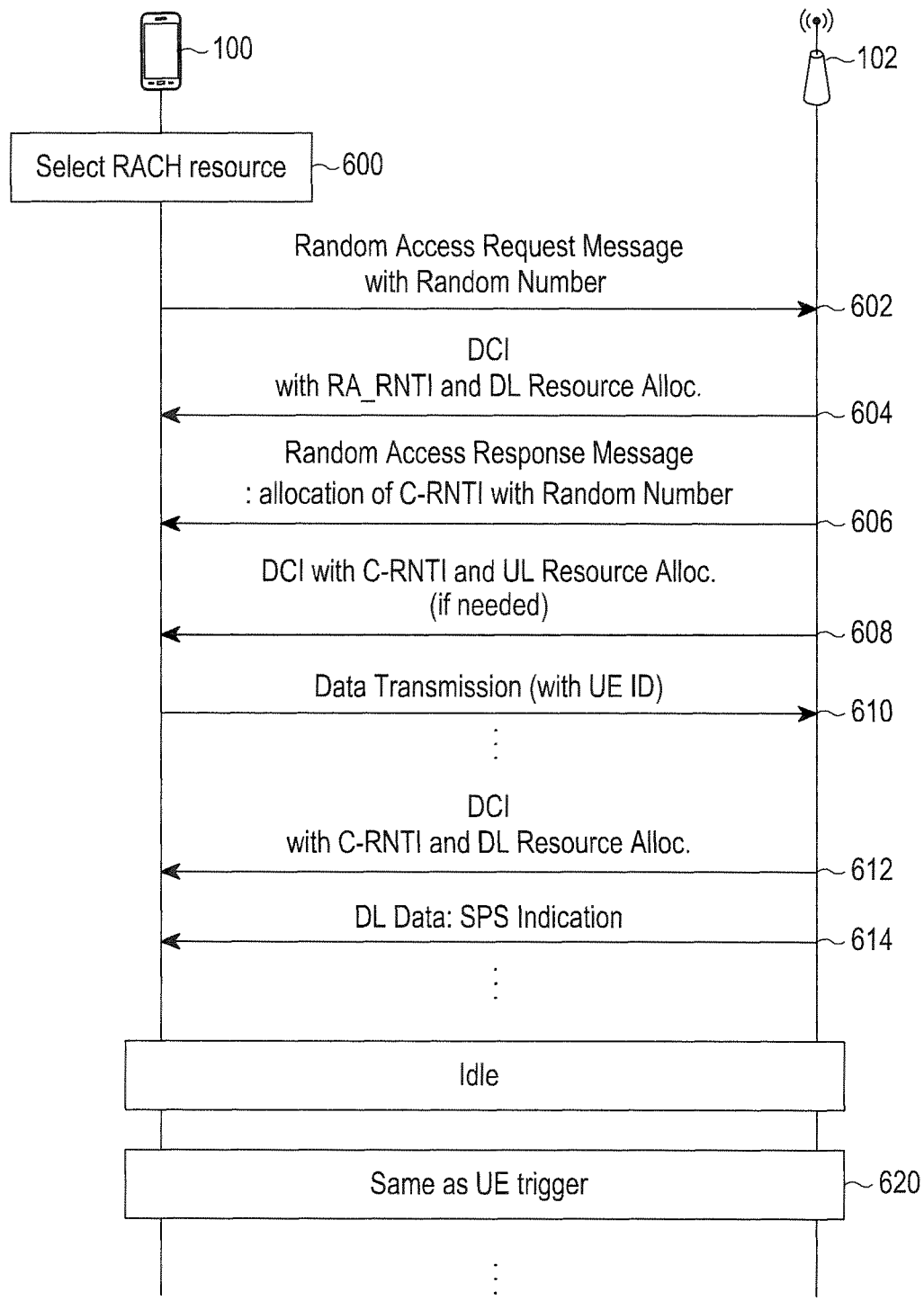
FIG. 6 is a view illustrating an example of another method in which an SPS UE ID is used when a base station triggers a designation of an SPS UE according to the present disclosure.

FIG. 6 is a view illustrating an example of another method in which an SPS UE ID is used when a base station triggers a designation of an SPS UE according to the present disclosure.

Also in FIG. 6, the base station determines whether to designate the UE as SPS UE based on the UE ID contained in the UL data upon first UL data transmission after the UE's initial attachment. In FIG. 6, such operations are performed that the base station designates the UE as SPS UE, and the UE requests to authorize the UE as SPS UE at the next UL transmission. That is, in FIG. 6, the UE designated as SPS UE operates in the same way as the UE trigger scheme upon the next UL transmission.

Operations 600 to 610 in FIG. 6 are the same as operations 500 to 510 in FIG. 5, and thus, no detailed description thereof is given.

The base station 102 may determine whether to designate the UE 100 as SPS UE based on the UE ID contained in the UL data 610.

If the base station 102 designates the UE 100 as SPS UE, the base station may perform SPS configuration. The SPS configuration may include at least one of the operation 612 of transmitting a DCI containing the C-RNTI and the DL resource allocation information for DL data transmission and the operation 614 of transmitting an SPS indication, as DL data, through the allocated DL resource. For example, schemes in which the base station 102 indicates the UE 100 as SPS UE include: 1) the scheme of making such designation using a one-bit SPS indicator in the DCI 612; or 2) the scheme of transmitting an SPS indication, as DL data 614, in the DL resource indicated by the DCI 612.

As such, the UE 100 indicated as SPS UE performs SPS transmission by further conducting the SPS transmission request operation of the UE trigger scheme disclosed in FIG. 2 or 3.

FIG. 6 exemplifies message-type transmission in which the random number is included in the random access request message 602. Sequence-type transmission in which the random sequence is contained in the initial random access request message may be performed similar to the operations exemplified in FIG. 3. That is, if the random sequence is transmitted in the random access request message 602, operations 604 to 610 in FIG. 6 may be replaced with operations 304 to 310 in FIG. 3. However, the contention resolution message 308 to be transmitted in FIG. 6 would be of the type in which the C-RNTI is included instead of the SPS-C-RNTI.

Figure 7:
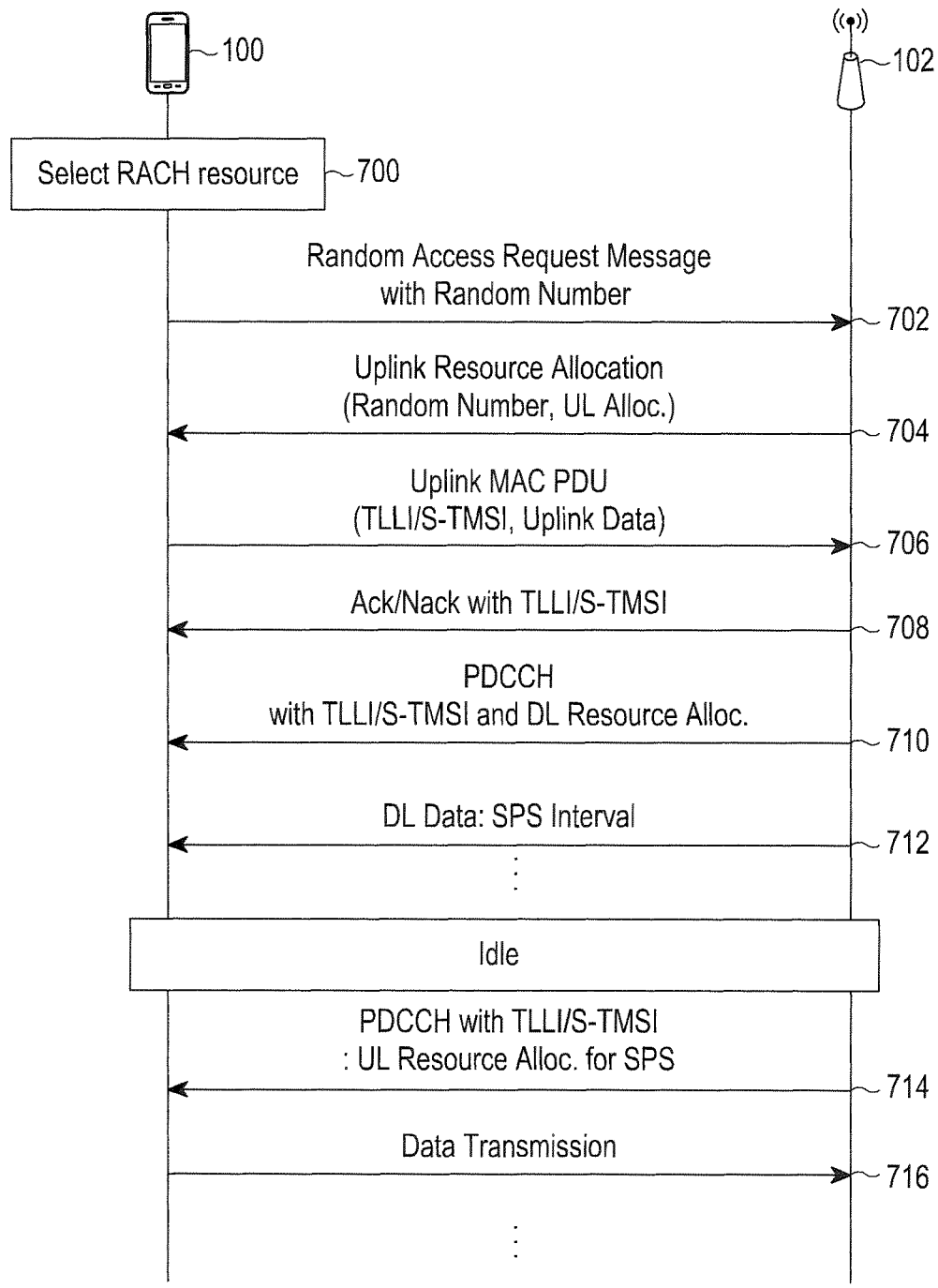
FIG. 7 is a view illustrating an example of a method in which a unique ID is used when a base station triggers a designation of an SPS UE according to the present disclosure.

FIG. 7 is a view illustrating an example of a method in which a unique ID is used when a base station triggers a designation of an SPS UE according to the present disclosure.

In FIG. 7, the base station may determine whether to designate the UE as SPS UE based on the UE ID transmitted in the first UL MAC PDU after the UE's initial attachment.

The UE 100 may select a RACH resource for transmission of the random access request message (700).

The UE 100 may transmit the random access request message to the base station 102 using the selected RACH resource (702). The random access request message may include the random number.

In response to the random access request message 702, the base station 102 may transmit, to the UE 100, UL resource allocation information for UL MAC PDU transmission and the random number (704).

The UE 100 may transmit the MAC PDU of the UL data in the allocated UL resource (706). The MAC PDU of the UL data may contain the unique ID (TLLI or S-TMSI) of the UE 100.

Upon receiving the UL MAC PDU, the base station 102 may transmit an ACK or NACK signal containing the unique ID to the UE 100 (708). The base station 102 may determine whether to designate the UE 100 as SPS UE based on the UE ID contained in the UL MAC PDU 706. The conditions enumerated above in connection with FIG. 5 may be used for the determination as to whether to designate the UE.

Having determined to designate the UE 100 as SPS UE, the base station 102 may perform an SPS configuration. The SPS configuration may include the operation 710 of transmitting a physical downlink control channel (PDCCH) containing the unique ID of the UE 100 and the DL resource allocation information for DL data transmission and the operation 712 of transmitting information about the SPS interval, as DL data, through the allocated DL resource. That is, the base station 102 indicates that the UE 100 is designated as SPS UE through the DL data 712 transmitted in the SPS configuration.

The DL data 712 transmitted in the SPS configuration may include, e.g., information about the first SPS transmission time, as well as the SPS interval information.

Designation of the payload size and UL resource allocation for substantive SPS transmission are performed prior to (714) the first SPS transmission time 716. The time 714 at which the UL resource for SPS transmission is allocated may become the start point of next SPS transmission as per the definition of the SPS interval. The designation of the SPS interval will be described below.

Figure 8:
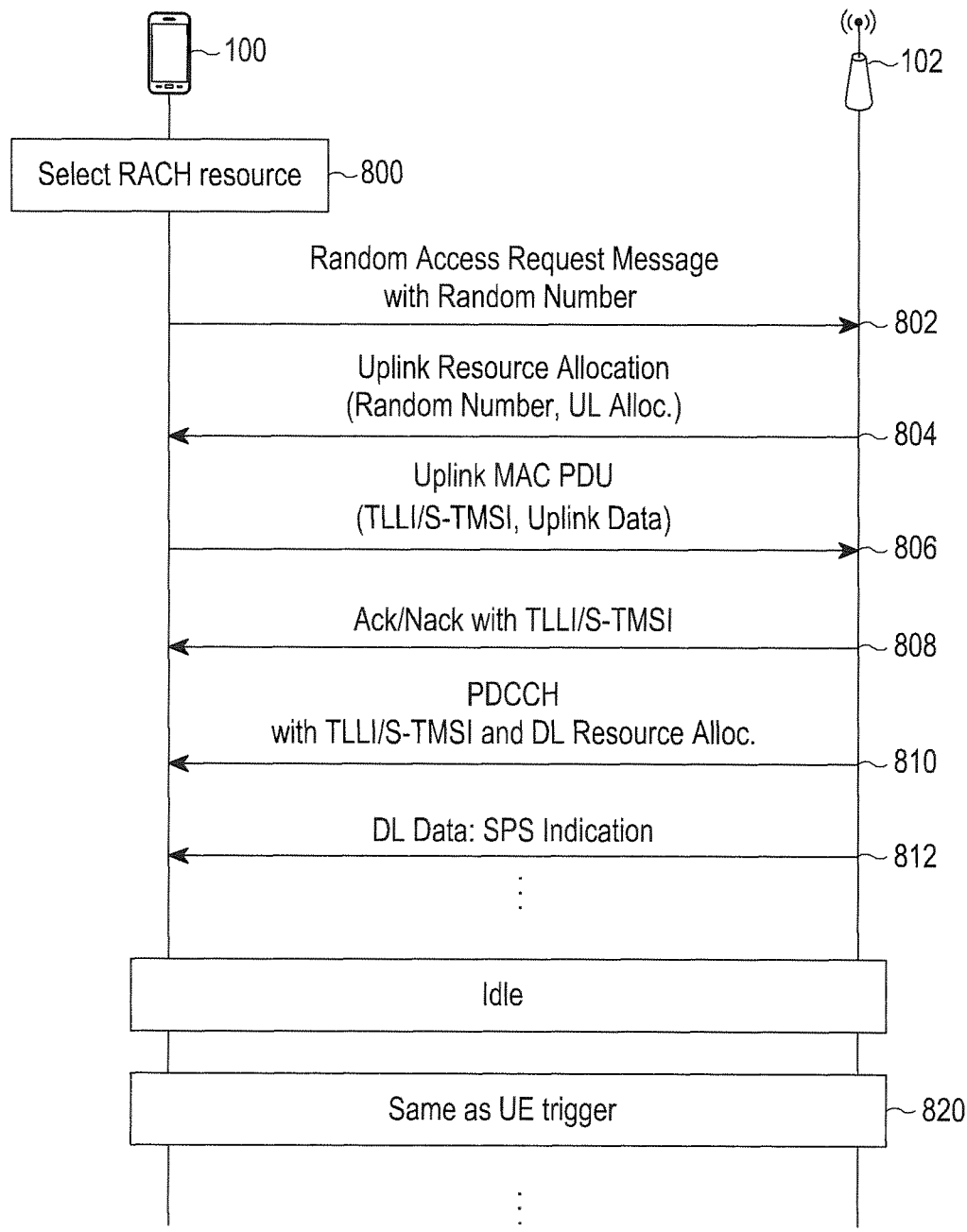
FIG. 8 is a view illustrating an example of another method in which a unique ID is used when a base station triggers a designation of an SPS UE according to the present disclosure.

FIG. 8 is a view illustrating an example of another method in which a unique ID is used when a base station triggers a designation of an SPS UE according to the present disclosure.

Also in FIG. 8, the base station determines whether to designate the UE as SPS UE based on the UE ID transmitted in the first UL MAC PDU after the UE's initial attachment. In FIG. 8, such operations are performed that the base station designates the UE as SPS UE, and the UE requests to authorize the UE as SPS UE at the next UL transmission. That is, in FIG. 8, the UE designated as SPS UE operates in the same way as the UE trigger scheme upon the next UL transmission.

Operations 800 to 808 in FIG. 8 are the same as operations 700 to 708 in FIG. 7, and thus, no detailed description thereof is given.

The base station 102 may determine whether to designate the UE 100 as SPS UE based on the UE ID contained in the UL MAC PDU 806. The conditions enumerated above in connection with FIG. 5 may be used for the determination as to whether to designate the UE.

Having determined to designate the UE 100 as SPS UE, the base station 102 may perform an SPS configuration. The SPS configuration may include at least one of the operation 810 of transmitting a PDCCH containing the unique ID of the UE 100 and the DL resource allocation information for DL data transmission and the operation 812 of transmitting an SPS indication, as DL data, through the allocated DL resource. For example, schemes in which the base station 102 indicates the UE 100 as SPS UE include: 1) the scheme of making such designation using a one-bit SPS indicator in the PDCCH 810; or 2) the scheme of transmitting an SPS indication, as DL data 812, in the DL resource indicated by the PDCCH 810.

As such, the UE 100 indicated as SPS UE performs SPS transmission by further conducting the SPS transmission request operation of the UE trigger scheme disclosed in FIG. 2 or 3.

Where the resource allocated for SPS transmission is difficult to use any more for the SPS transmission purpose, the allocated resource may be adjusted through a future resource reconfiguration operation.

SPS Resource Reconfiguration

The resource allocated to the UE for SPS transmission may need to be adjusted. Examples of resource reconfiguration include: resource reconfiguration at the request from the UE; and 2) resource reconfiguration by a command from the base station.

As an embodiment of the resource reconfiguration by the UE's request, a CIoT system which is operated in separate coverage classes may be taken into account. CC refers to a class of the UE differentiated per mutual coupling loss (MCL). In the CIoT system, the UE is divided into coverage classes as per MCSs between base station and UE, and a different modulation, coding, repetition count, and spreading length upon UL/DL transmission may be set per coverage class. The use of the concept of CC may reduce UL-DL scheduling overhead. Accordingly, where the CC is varied, the UE may notify the base station of the varied CC, allowing seamless reception of control channel and paging information. Further, when the CC changes, such a process is necessary as to change the size of the resource for SPS transmission. Despite the same size of payload, the variation in the CC may result in a variation in modulation, coding, repetition count, or spreading length, and this is why such also means that the SPS transmission resource changes.

A resource reconfiguration for more efficient use of UL resource may be brought up as an embodiment of the resource reconfiguration by a command from the base station. The context of UL frequency allocation may be subject to a change over time due to, e.g., the release of the resource allocated to the non-SPS UE or the release of the resource as the SPS UE changes cells, and the resource needs to be organized for more efficient use of such UL frequency. In particular, SPS UEs lacking mobility are highly likely to remain communicating in the same CC in the cell for a very long time (e.g., 1 year or a few years), and in this case, they may be reassigned resources for SPS.

If resource reconfiguration information is received from the base station, the time of the reception of the DCI containing the resource reconfiguration information may be reset to the reference time of the SPS interval.

A method in which an SPS resource is reconfigured by a request from the UE is described with reference to FIGS. 9 to 12.

Figure 9:
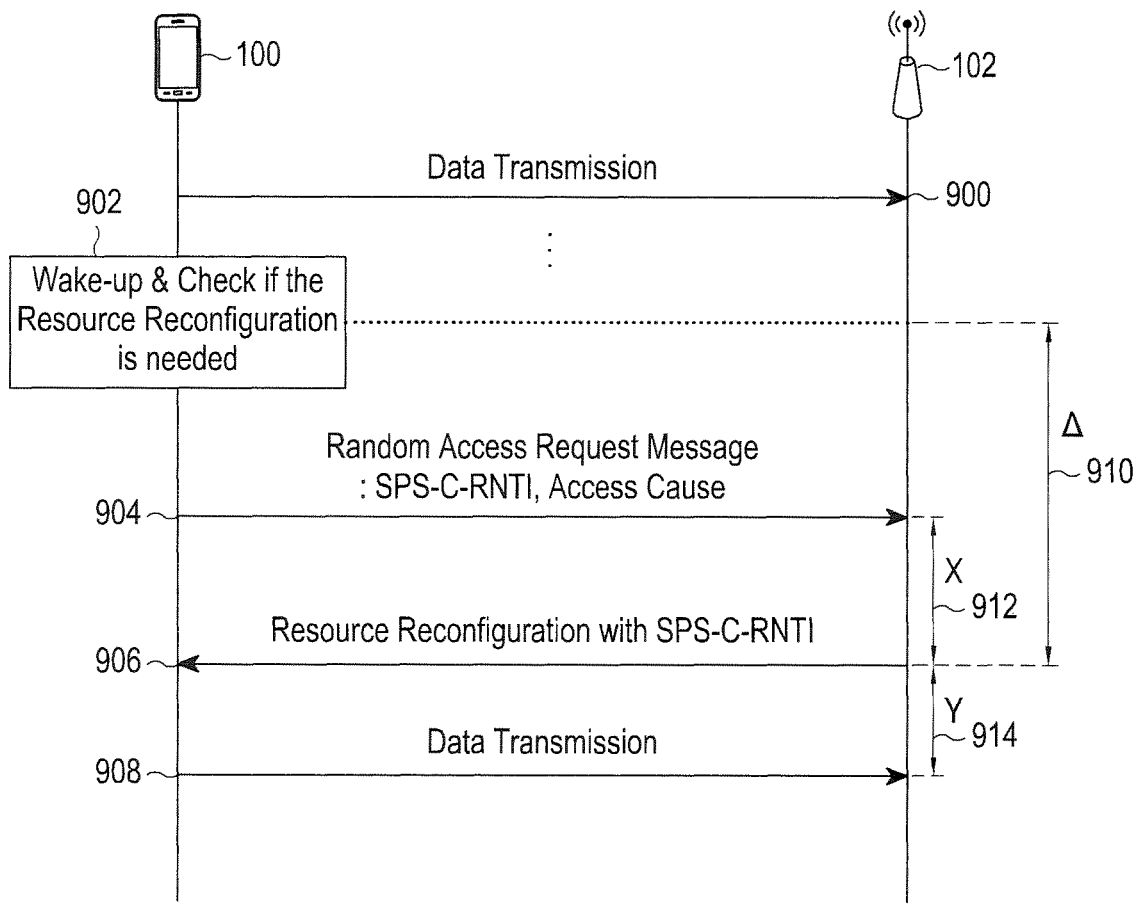
FIG. 9 is a view illustrating an example of a method in which an SPS UE ID is used when a UE requests an SPS resource reconfiguration according to the present disclosure.

FIG. 9 is a view illustrating an example of a method in which an SPS UE ID is used when a UE requests an SPS resource reconfiguration according to the present disclosure.

Where the CC of the UE 100 is changed between UL data SPS transmission 900 and next UL data SPS transmission 908 so that the base station 102 is notified of the CC change in the UE 100 (a scheme of notifying the system of a CC change is newly transmitting (904) a random access request), the base station 102 may identify the varied CC before the next UL data SPS transmission to reconfigure the SPS resource. Before performing the next SPS transmission 908, the UE 100 needs to identify whether its CC has changed to be able to determine whether resource reconfiguration is required. Thus, the UE 100 wakes up before the next SPS transmission 908 to check its CC (902).

Specifically, the UE 100 may wake up a Δ time 910 before the time of the next UL data SPS transmission 908 or the time that the resource reconfiguration 906 is achieved, and if a resource reconfiguration (e.g., a CC change) is needed, the UE 100 may request the base station 102 to perform a resource reconfiguration (904). Where no resource reconfiguration for the UE is required before the UL data SPS transmission 908, the UE may perform UL data transmission in a pre-scheduled SPS resource.

A +X time 912 after the time of the resource reconfiguration request 904 by the UE 100, the UE 100 may receive resource reconfiguration information 906. The resource reconfiguration information 906 may contain frequency/time axis resource information for UL transmission. Or, such setting may be made, without time information, that data transmission 908 is performed a +Y time 914 after the resource reconfiguration 906. The X time information and the Y time information may previously be set as system information or may be set together with the SPS-C-RNTI in the random access request message 904 sent from the UE 100.

Or, the resource reconfiguration information 906 may contain information about an SPS interval (i.e., SPS transmission period) that is subject to a change. Unless the time at which the resource reconfiguration is achieved conforms to the SPS transmission timing originally scheduled, the time of actual reception of the resource reconfiguration 906 may be designated as the start point of a new SPS interval.

In FIG. 9, as the UE 100 uses the already allocated SPS-C-RNTI in the resource reconfiguration request, RACH procedures for being newly assigned a C-RNTI are unnecessary.

Figure 10:
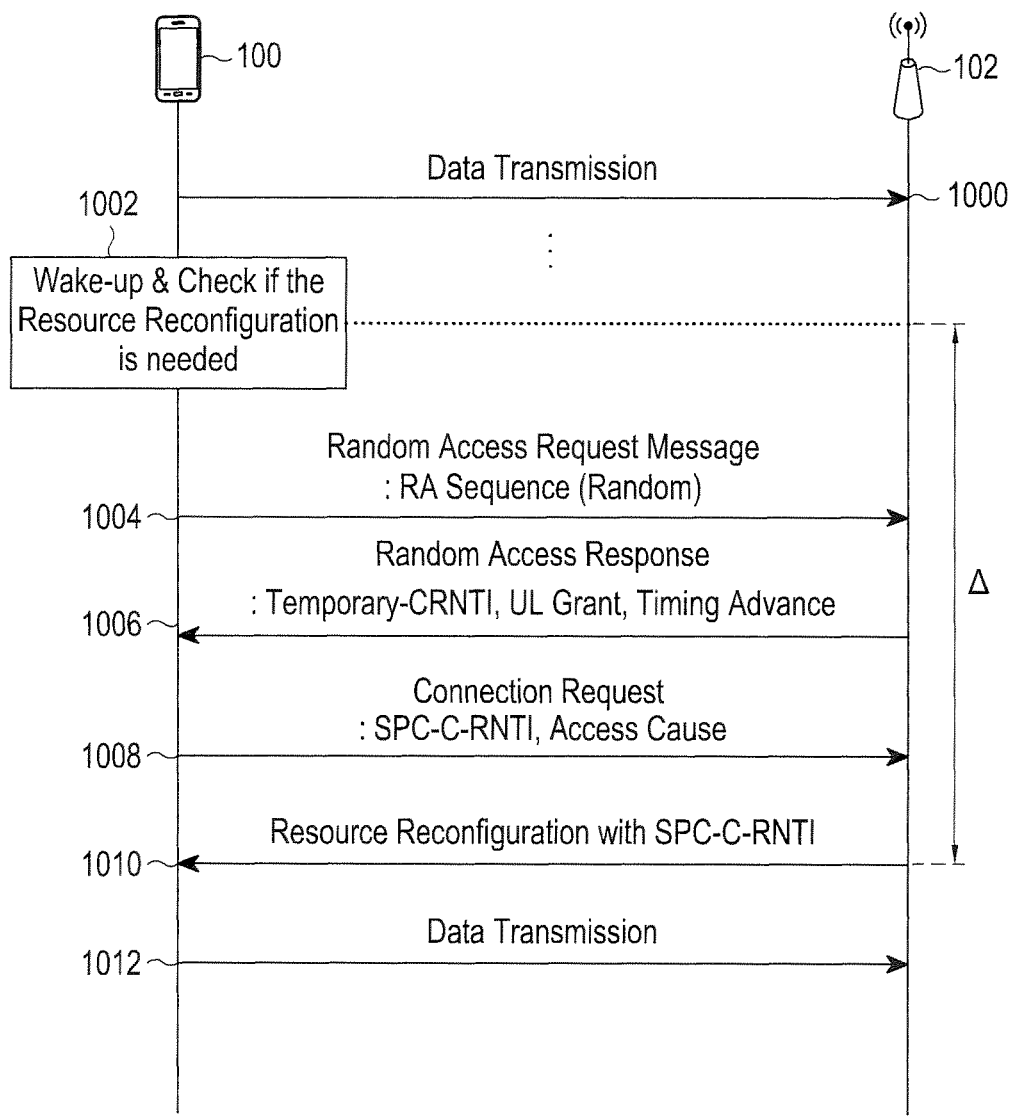
FIG. 10 is a view illustrating an example of another method in which an SPS UE ID is used when a UE requests an SPS resource reconfiguration according to the present disclosure.

FIG. 10 is a view illustrating an example of another method in which an SPS UE ID is used when a UE requests an SPS resource reconfiguration according to the present disclosure.

In FIG. 10, the use of the SPS-C-RNTI already allocated eliminates the need for allocation of a new C-RNTI and resource allocation to resovlve collision through the temporary-C-RNTI (T-C-RNTI).

Where the CC of the UE 100 is changed between UL data SPS transmission 1000 and next UL data SPS transmission 1012 so that the base station 102 is notified of the CC change in the UE 100 (a scheme of notifying the system of a CC change is newly transmitting (1004) a random access request), the base station 102 may identify the varied CC before the next UL data SPS transmission 1012 to reconfigure the SPS resource. Before performing the next SPS transmission 1012, the UE 100 needs to identify whether its CC has changed to be able to determine whether resource reconfiguration is required. Thus, the UE 100 wakes up before the next SPS transmission 1012 to check its CC (1002).

Specifically, the UE 100 may wake up a Δ time before the time of the next UL data SPS transmission 1012 or the time that the resource reconfiguration 1010 is achieved, and if a resource reconfiguration (e.g., a CC change) is needed, the UE 100 may transmit a random access request message containing a RA sequence (1004) and receive a random access response message (1006). The UE 100 may request the base station 102 to perform an SPS resource reconfiguration by sending a connection request message 1008 containing the SPS-C-RNTI. The UE 100 may receive a resource reconfiguration from the base station 102 (1010). The UE 100 transmits the connection request message 1008 using the SPS-C-RNTI already configured, eliminating the need for reception of a contention resolution message for being assigned a new C-RNTI.

Where no resource reconfiguration for the UE is required before the UL data SPS transmission 1012, the UE may perform UL data transmission in a pre-scheduled SPS resource.

Figure 11:
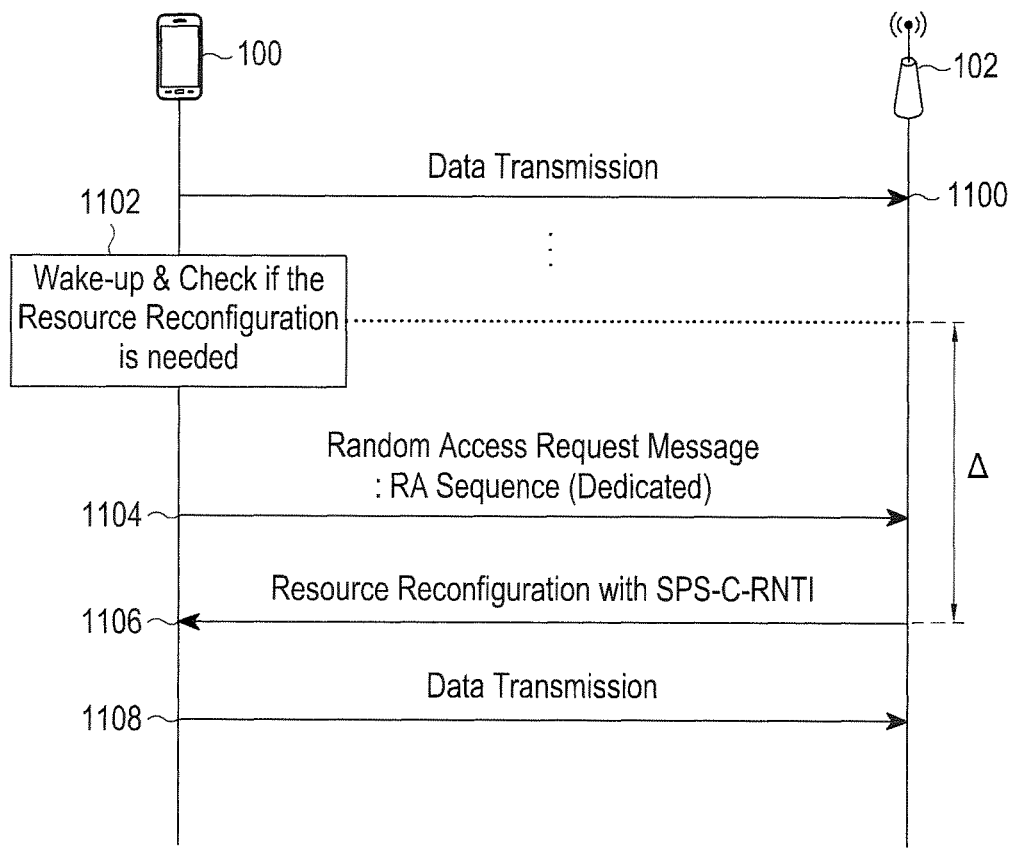
FIG. 11 is a view illustrating an example of still another method in which an SPS UE ID is used when a UE requests an SPS resource reconfiguration according to the present disclosure.

FIG. 11 is a view illustrating an example of another method in which an SPS UE ID is used when a UE requests an SPS resource reconfiguration according to the present disclosure.

FIG. 11 is directed to an embodiment in which a UE assigned an SPS-C-RNTI, upon random access for resource reconfiguration, uses a unique sequence that may be used without collision with other users.

Where the CC of the UE 100 is changed between UL data SPS transmission 1100 and next UL data SPS transmission 1108 so that the base station 102 is notified of the CC change in the UE 100 (a scheme of notifying the system of a CC change is newly transmitting (1104) a random access request), the base station 102 may identify the varied CC before the next UL data SPS transmission 1108 to reconfigure the SPS resource. Before performing the next SPS transmission 1108, the UE 100 wakes up before the next SPS transmission 1108 to check its CC so as to identify whether its CC has changed (1102).

Specifically, the UE 100 may wake up a Δ time before the time of the next UL data SPS transmission 1108 or the time that the resource reconfiguration 1106 is achieved, and if a resource reconfiguration (e.g., a CC change) is needed, the UE 100 may transmit a random access request message containing a unique (dedicated) RA sequence (1104), and the UE 100 may receive a resource reconfiguration 1106 containing the SPS-C-RNTI.

Where no resource reconfiguration for the UE is required before the UL data SPS transmission 1108, the UE may perform UL data transmission in a pre-scheduled SPS resource.

Figure 12:
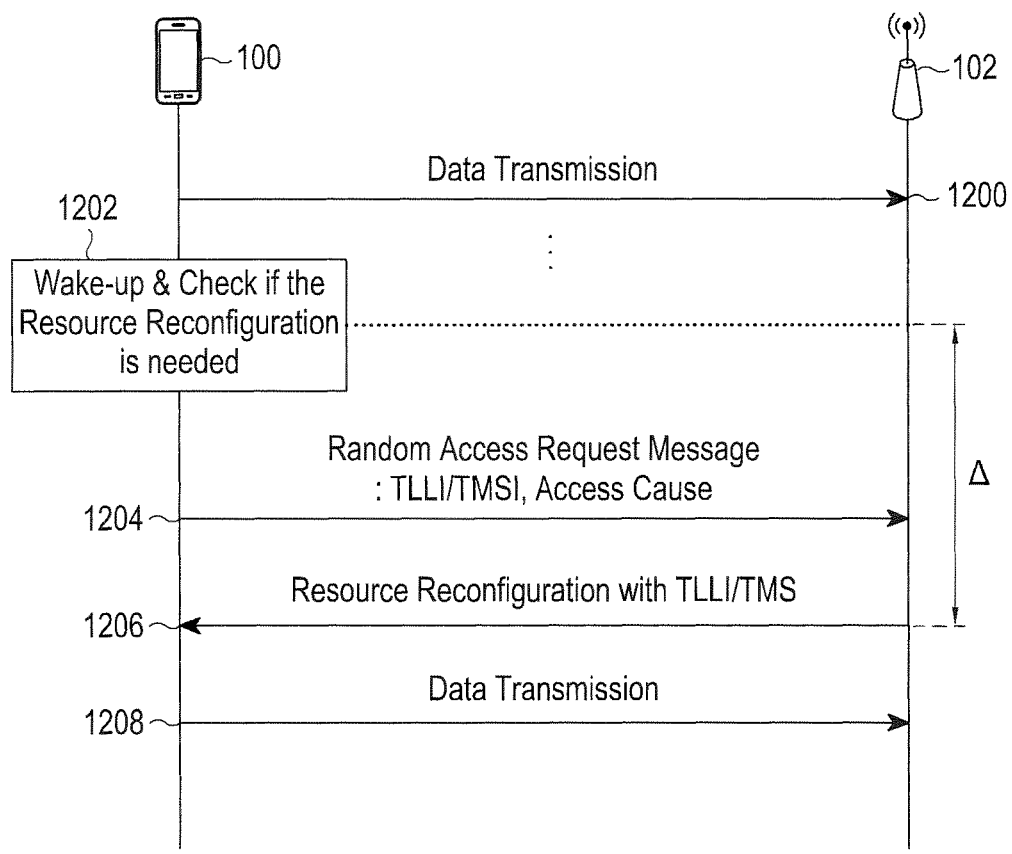
FIG. 12 is a view illustrating an example of a method in which a unique ID is used when a UE requests an SPS resource reconfiguration according to the present disclosure.

FIG. 12 is a view illustrating an example of a method in which a unique ID is used when a UE requests an SPS resource reconfiguration according to the present disclosure.

FIG. 12 is directed to an embodiment in which a UE performing SPS communication using a unique ID requests a resource reconfiguration using the unique ID.

Where the CC of the UE 100 is changed between UL data SPS transmission 1200 and next UL data SPS transmission 1208 so that the base station 102 is notified of the CC change in the UE 100 (a scheme of notifying the system of a CC change is newly transmitting (1204) a random access request), the base station 102 may identify the varied CC before the next UL data SPS transmission 1208 to reconfigure the SPS resource. Before performing the next SPS transmission 1208, the UE 100 wakes up before the next SPS transmission 1208 to check its CC so as to identify whether its CC has changed (1202).

Specifically, the UE 100 may wake up a Δ time before the time of the next UL data SPS transmission 1208 or the time that the resource reconfiguration 1206 is achieved, and if a resource reconfiguration (e.g., a CC change) is needed, the UE 100 may transmit a random access request message containing the unique ID of the UE 100 (1204), and the UE 100 may receive a resource reconfiguration 1206 containing the unique ID (1206).

Where no resource reconfiguration for the UE is required before the UL data SPS transmission 1208, the UE may perform UL data transmission in a pre-scheduled SPS resource.

A method in which an SPS resource is reconfigured by a command from a base station is described with reference to FIGS. 13 to 15.

Figure 13:
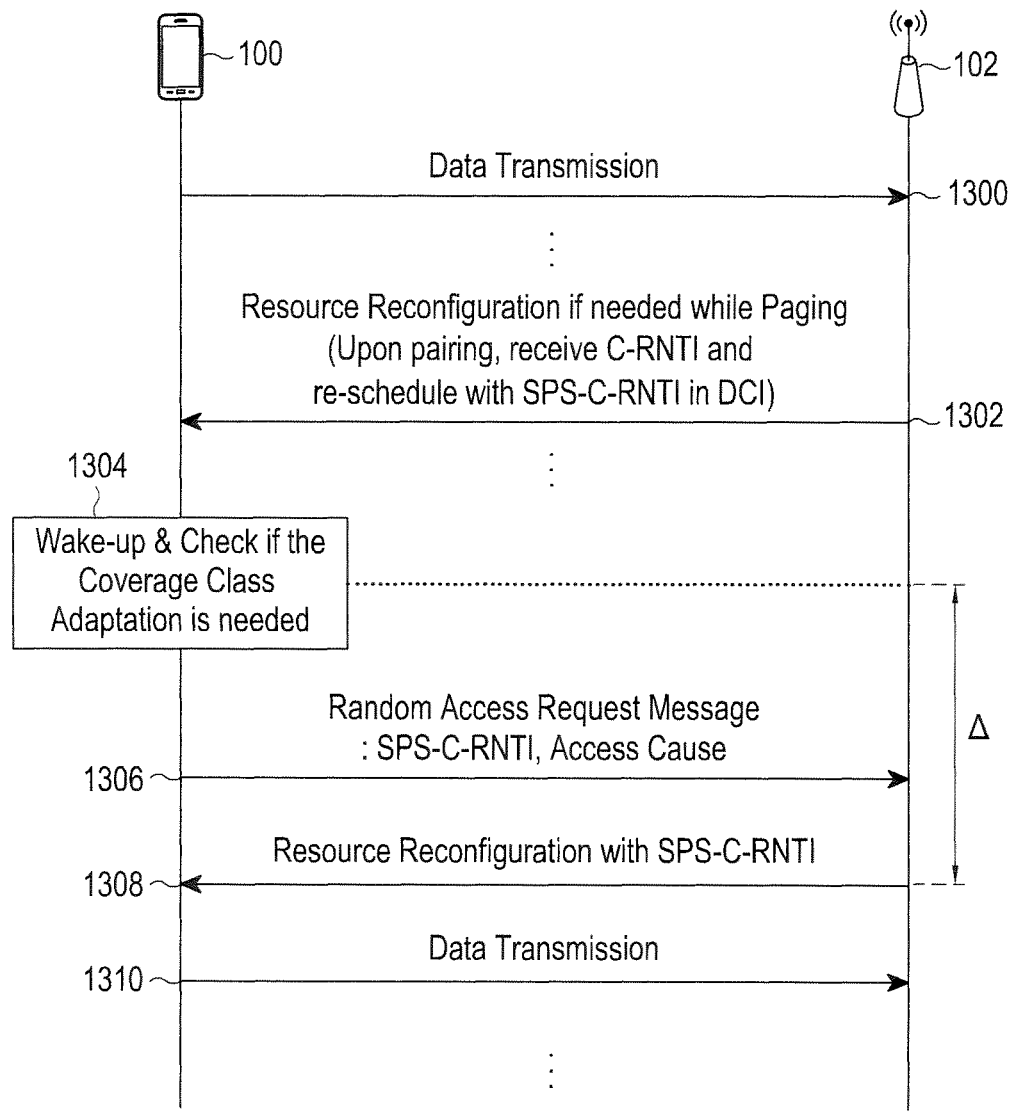
FIG. 13 is a view illustrating an example of a method in which an SPS UE ID is used when an SPS resource reconfiguration is performed by a command from a base station according to the present disclosure.

FIG. 13 is a view illustrating an example of a method in which an SPS UE ID is used when an SPS resource reconfiguration is performed by a command from a base station according to the present disclosure.

The UE 100 having performed UL data SPS transmission 1300 may receive a resource reconfiguration message from the base station upon paging (1302). Specifically, if the UE 100 receives the C-RNTI upon paging and receives rescheduling information about the resource through the SPS-C-RNTI in the DCI, the UE 100 may determine that the resource rescheduling information is SPS resource reconfiguration information and override existing configuration information with the rescheduling information. Or, the UE 100 may determine that the UL resource allocation information using the SPS-C-RNTI received in the connected state is the command for SPS resource reconfiguration from the base station.

Also in this case, the UE may wake up before the next SPS transmission 1310 to determine whether to need to apply its changed CC (1304). The UE 100 may request a resource reconfiguration by sending a random access request message 1306 to the base station 102. Here, the random access request message may contain message type information (i.e., SPS-C-RNTI or access cause). The UE 100 may receive a resource reconfiguration 1308 in response to the request.

Figure 14:
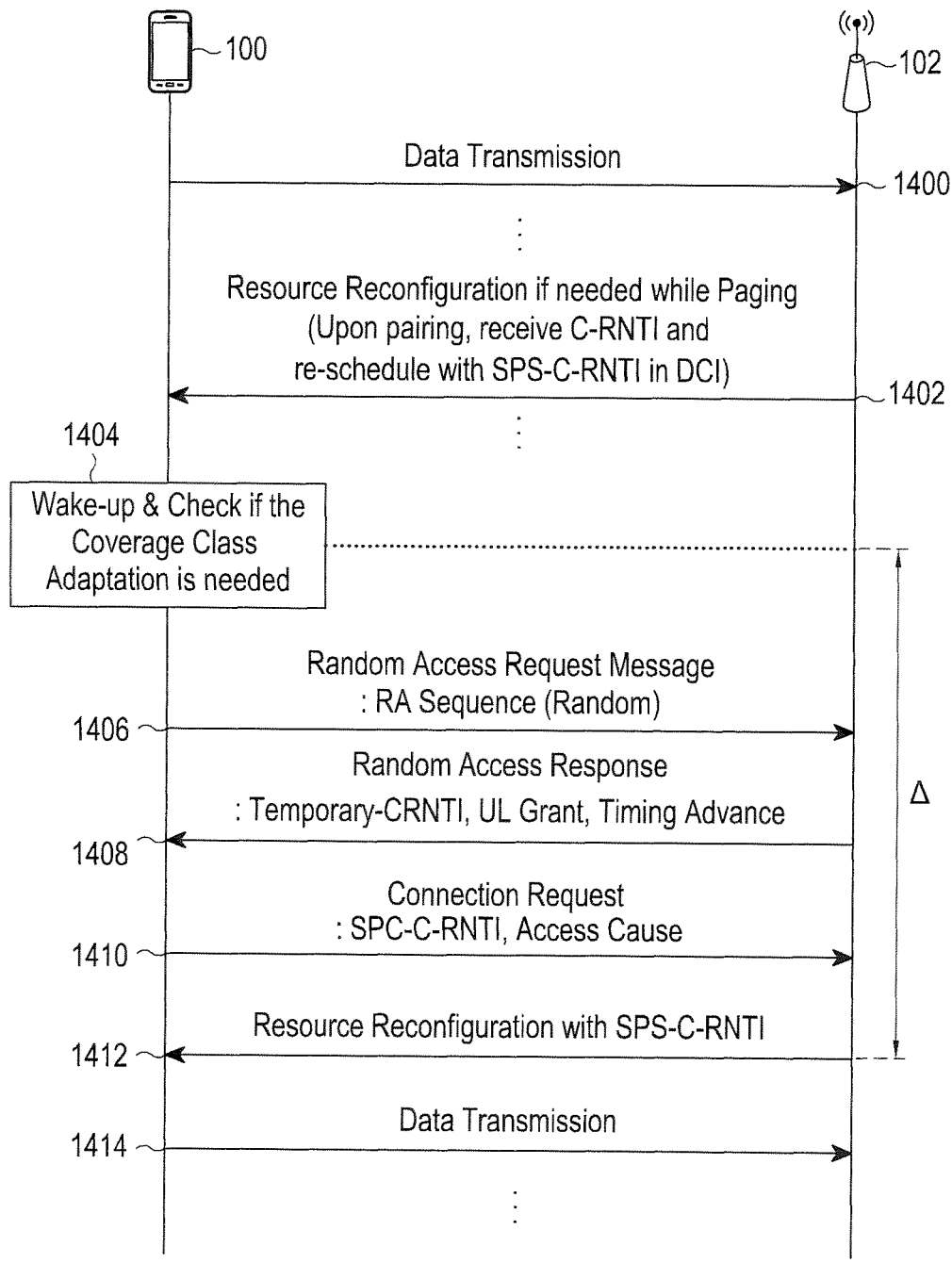
FIG. 14 is a view illustrating an example of another method in which an SPS UE ID is used when an SPS resource reconfiguration is performed by a command from a base station according to the present disclosure.

FIG. 14 is a view illustrating an example of another method in which an SPS UE ID is used when an SPS resource reconfiguration is performed by a command from a base station according to the present disclosure.

Operations 1400 to 1402 in FIG. 14 are the same as operations 1300 to 1302 in FIG. 13, and thus, no detailed description thereof is given.

Also in this case, the UE may wake up before the next SPS transmission 1414 to determine whether to need to apply its changed CC (1404). The UE 100 may transmit a random access request message 1406 to the base station 102. Here, the random access request message 1406 may contain sequence type information (i.e., RA sequence). The UE 100 may receive a random access response message in response to the request message 1406 (1408). The UE 100 may request the base station 102 to perform an SPS resource reconfiguration by sending a connection request message 1410 containing the SPS-C-RNTI. The UE 100 may receive a resource reconfiguration from the base station 102 (1412). The UE 100 transmits the connection request message 1412 using the SPS-C-RNTI already configured, eliminating the need for reception of a contention resolution message for being assigned a new C-RNTI.

Where no resource reconfiguration for the UE is required before the UL data SPS transmission 1414, the UE may perform UL data transmission in a pre-scheduled SPS resource.

Figure 15:
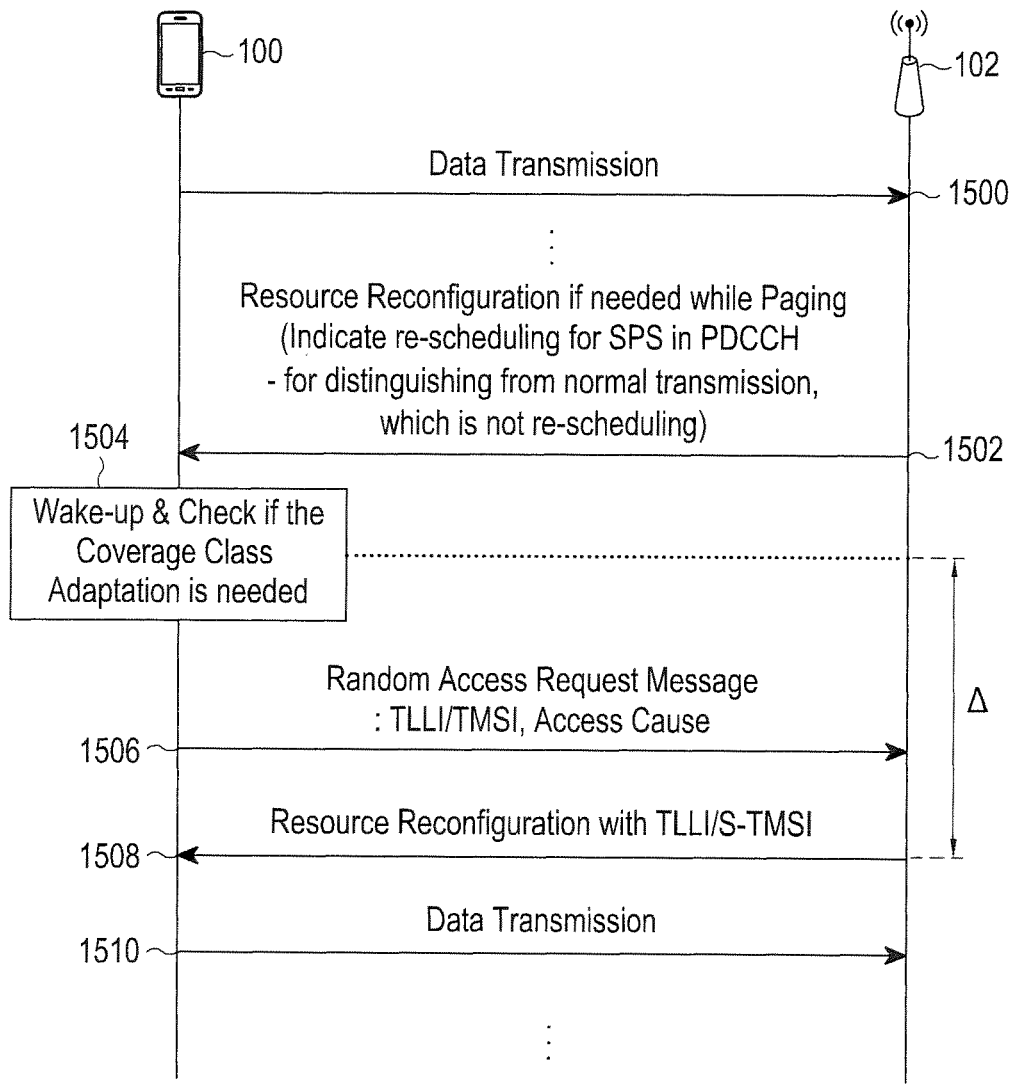
FIG. 15 is a view illustrating an example of a method in which a unique ID is used when an SPS resource reconfiguration is performed by a command from a base station according to the present disclosure.

FIG. 15 is a view illustrating an example of a method in which a unique ID is used when an SPS resource reconfiguration is performed by a command from a base station according to the present disclosure.

In FIG. 15, the base station may perform a resource reconfiguration through paging as in FIG. 13. At this time, however, the base station may specify that the resource allocation is for resource reconfiguration purposes using a one-bit indicator in a control channel, e.g., PDCCH, in order to distinguish from resource allocation for other transmission (e.g., supplemental resource assignment) other than the SPS transmission in the SPS transmission.

The UE 100 having performed UL data SPS transmission 1500 may receive a resource reconfiguration message from the base station upon paging (1502). Specifically, the UE 100 may receive resource rescheduling information on the PDCCH upon paging, and in order to determine that the resource rescheduling information is SPS resource reconfiguration information, the UE 100 may, with it, receive a one-bit indicator indicating being the resource reconfiguration.

Also in this case, the UE may wake up before the next SPS transmission 1510 to determine whether to need to apply its changed CC (1504). The UE 100 may request a resource reconfiguration by sending a random access request message 1306 to the base station 102. Here, the random access request message may contain message type information (i.e., the UE's unique ID or access cause). The UE 100 may receive a resource reconfiguration 1508 in response to the request.

Where no resource reconfiguration for the UE is required before the UL data SPS transmission 1510, the UE may perform UL data transmission in a pre-scheduled SPS resource.

Supplemental Resource Assignment to SPS UE

Supplemental resource assignment means resource allocation, to the SPS UE, for additional UL/DL data transmission in addition to the resource for SPS transmission, which is capable of: 1) a scheme by the UE's request; and 2) a scheme by a command from the base station.

A method in which supplemental resource assignment is performed to the SPS UE is described with reference to FIGS. 16 to 21.

Figure 16:
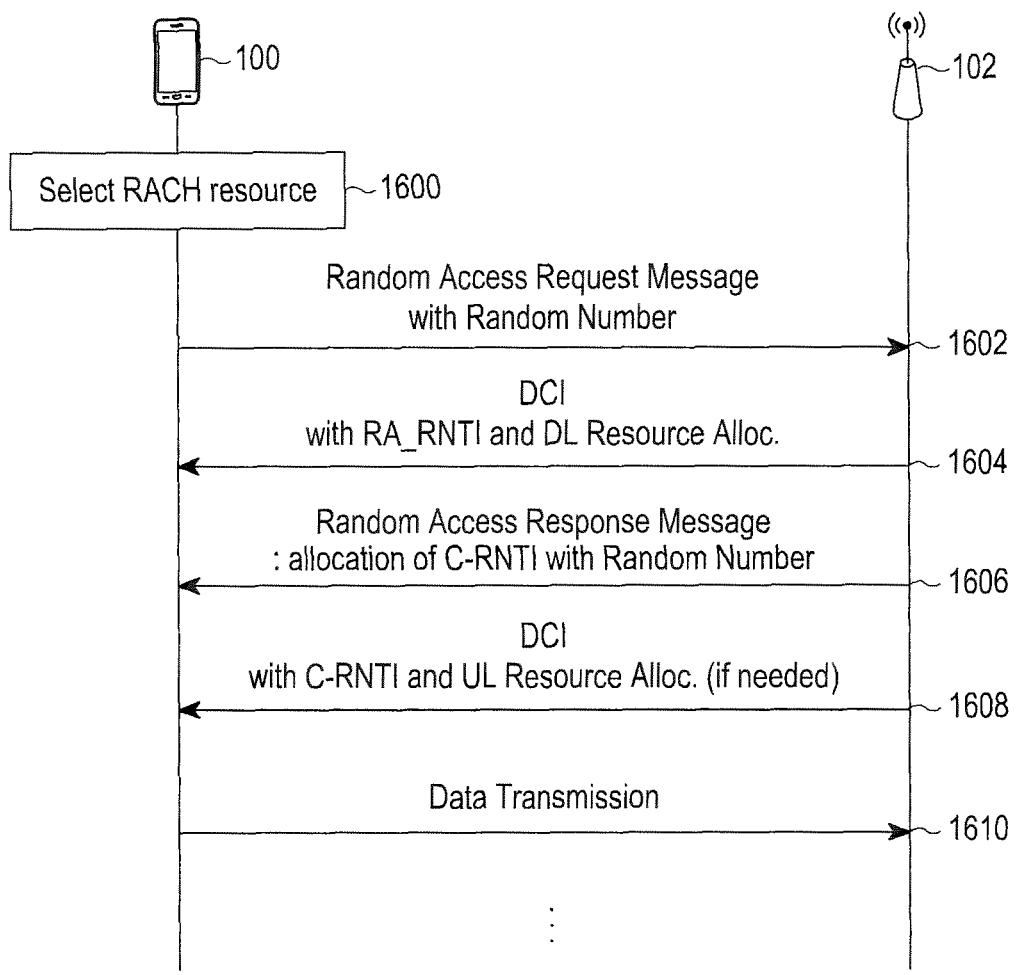
FIG. 16 is a view illustrating an example of a method in which an SPS UE ID is used when an SPS UE requests an additional resource allocation according to the present disclosure.

FIG. 16 is a view illustrating an example of a method in which an SPS UE ID is used when an SPS UE requests an additional resource allocation according to the present disclosure.

In FIG. 16, supplemental resource assignment may be performed using the C-RNTI.

The SPS UE 100 requesting the supplemental resource assignment may select a RACH resource (1600) and newly transmit a random access request message using the selected RACH resource (1602). In response to the random access request message 1602, the UE 100 may receive a DCI containing the RA-RNTI and DL resource allocation information and may receive a random access response message containing the random number and newly assigned C-RNTI (1608). The UE, upon receiving the DCI containing the C-RNTI and UL resource allocation information, may perform UL data transmission through the assigned UL resource.

Figure 17:
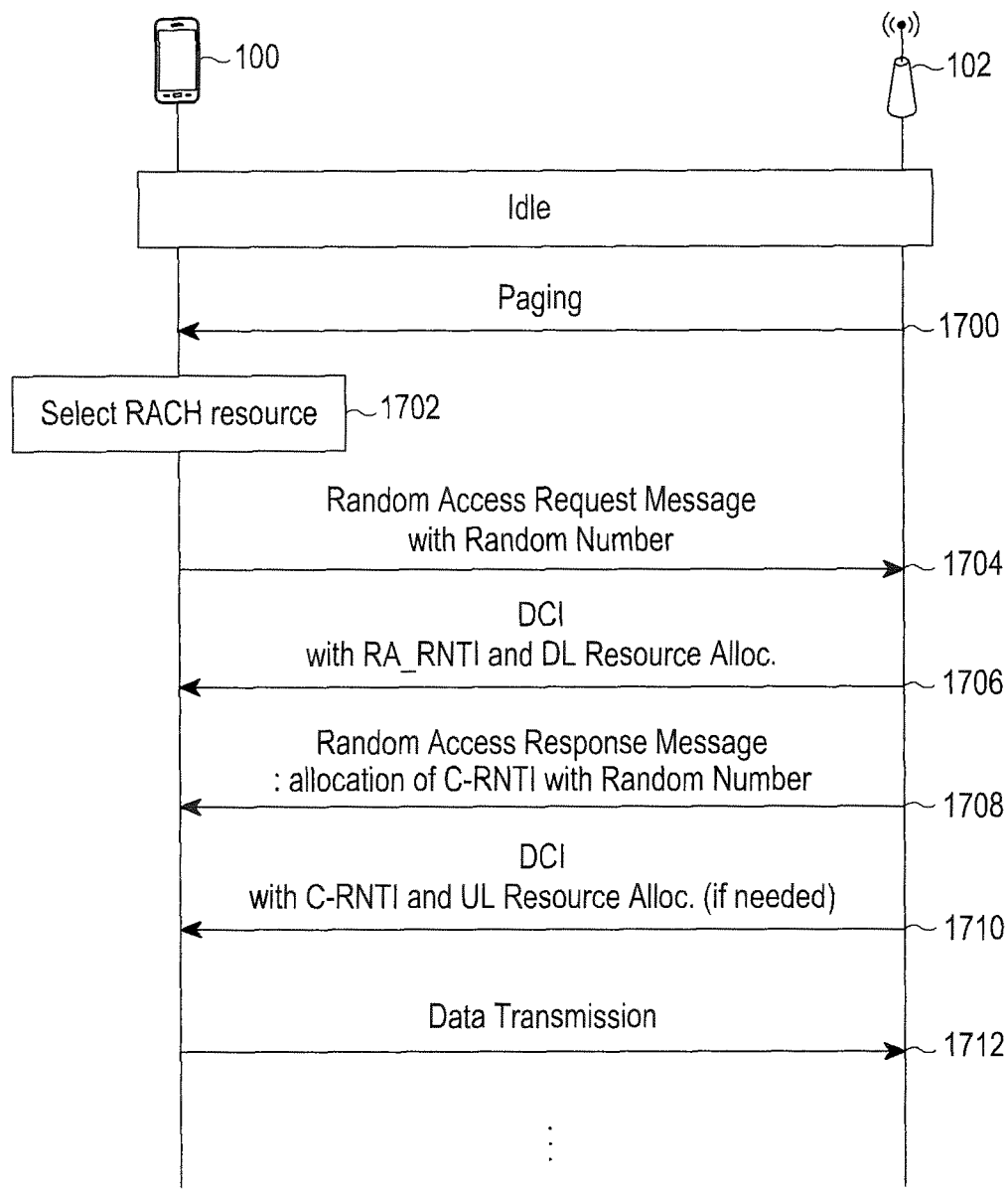
FIG. 17 is a view illustrating an example of a method in which an SPS UE ID is used when a base station instructs an additional resource allocation according to the present disclosure.

FIG. 17 is a view illustrating an example of a method in which an SPS UE ID is used when a base station instructs an additional resource allocation according to the present disclosure.

Also in FIG. 17, supplemental resource assignment may be performed using the C-RNTI.

In FIG. 17, the base station 102 may transmit a paging 1700 to the UE 100, awakening the idle UE 100. Operations 1704 to 1712 in FIG. 17 are the same as operations 1600 to 1610 in FIG. 16, and thus, no detailed description thereof is given.

Figure 18:
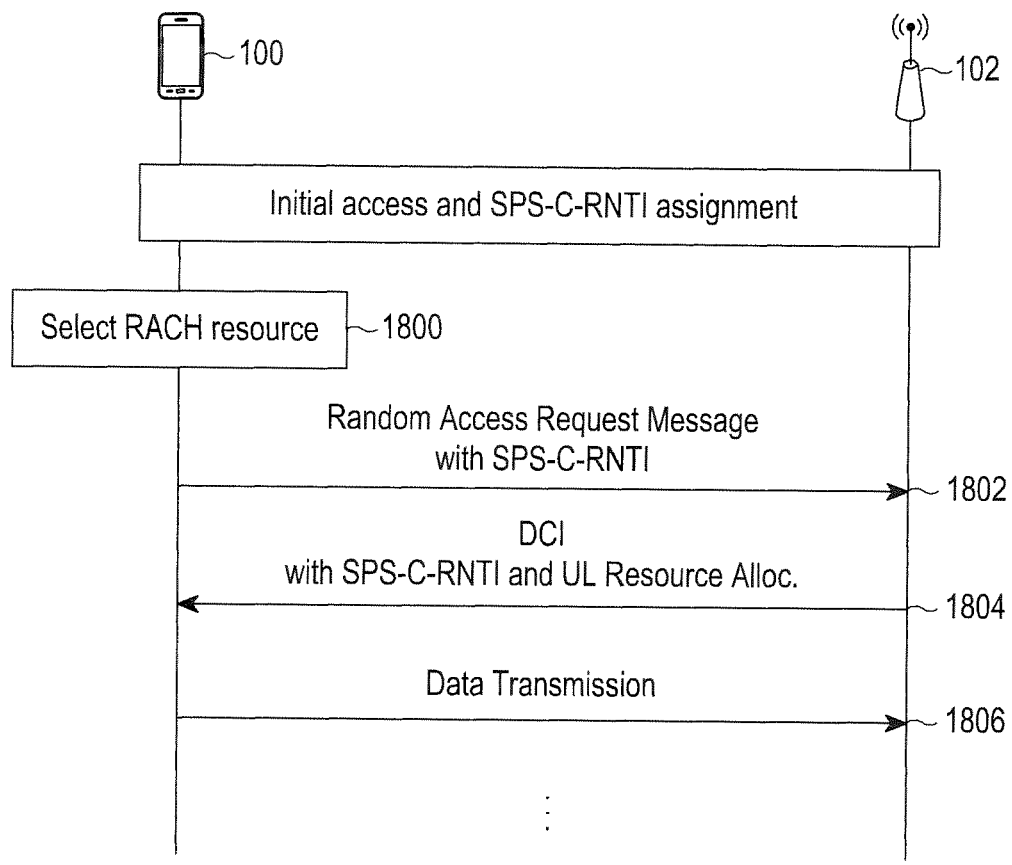
FIG. 18 is a view illustrating an example of a method in which an SPS UE ID is used when an SPS UE requests an additional resource allocation according to the present disclosure.

FIG. 18 is a view illustrating an example of a method in which an SPS UE ID is used when an SPS UE requests an additional resource allocation according to the present disclosure.

In FIG. 18, supplemental resource assignment may be performed using the SPS-C-RNTI.

The SPS-C-RNTI assigned to the UE in the system may be put to use in two types. The SPS-C-RNTI may be used for the resource reconfiguration purposes 1) the resource reconfiguration is achieved using the SPS-C-RNTI at the start point of the SPS interval (valid between the start point of SPS period and the SPS data transmission), and 2) in other cases, the UE may send a request for random access using the SPS-C-RNTI, and the base station assigns a DL/UL resource using the SPS-C-RNTI to thereby perform supplemental resource assignment (valid after the SPS data transmission (including when idle) and before the start point of the SPS period).

For example, although the SPS-C-RNTI is used for SPS resource reconfiguration upon paging in FIG. 13, the UE may otherwise perform supplemental resource assignment using the SPS-C-RNTI. So doing may save the UE from the step in which the UE should be assigned a C-RNTI by the base station upon supplemental resource assignment.

The SPS UE 100, which succeeded in the initial access procedure and was thus assigned the SPS-C-RNTI, may select a RACH resource (1800) and newly transmit a random access request message using the selected RACH resource (1802). The random access request message 1802 may contain the SPS-C-RNTI. In response to the random access request message 1802, the UE 100 may receive a DCI containing the SPC-R-RNTI and UL resource allocation information (1804). The UE may perform LTL data transmission through the assigned UL resource (1806).

Figure 19:
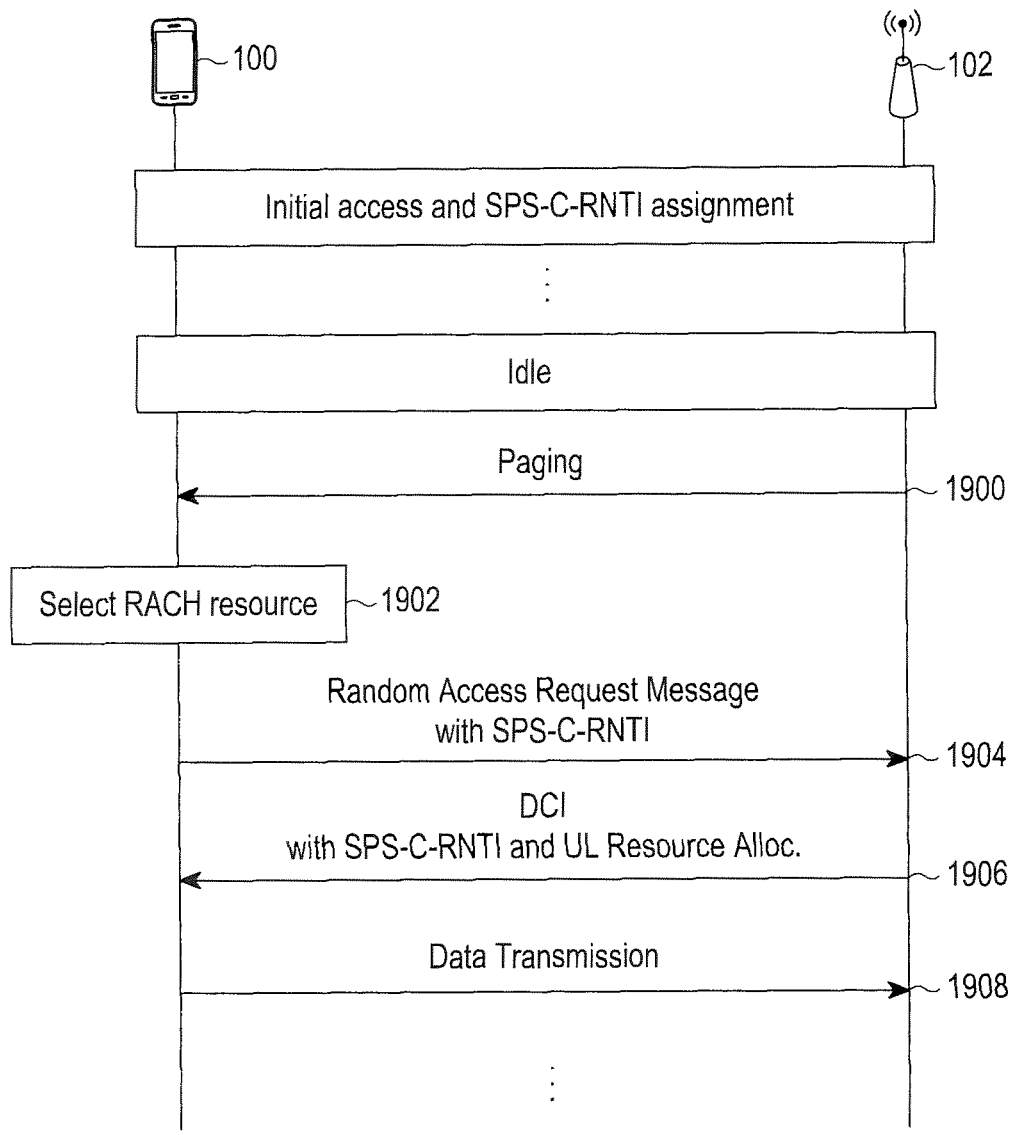
FIG. 19 is a view illustrating an example of a method in which an SPS UE ID is used when a base station instructs an additional resource allocation according to the present disclosure.

FIG. 19 is a view illustrating an example of a method in which an SPS UE ID is used when a base station instructs an additional resource allocation according to the present disclosure.

In FIG. 19, supplemental resource assignment may be performed using the SPS-C-RNTI.

In FIG. 19, the base station 102 may transmit a paging 1900 to the UE 100, awakening the idle UE 100. Operations 1902 to 1908 in FIG. 19 are the same as operations 1800 to 1806 in FIG. 18, and thus, no detailed description thereof is given.

Figure 20:
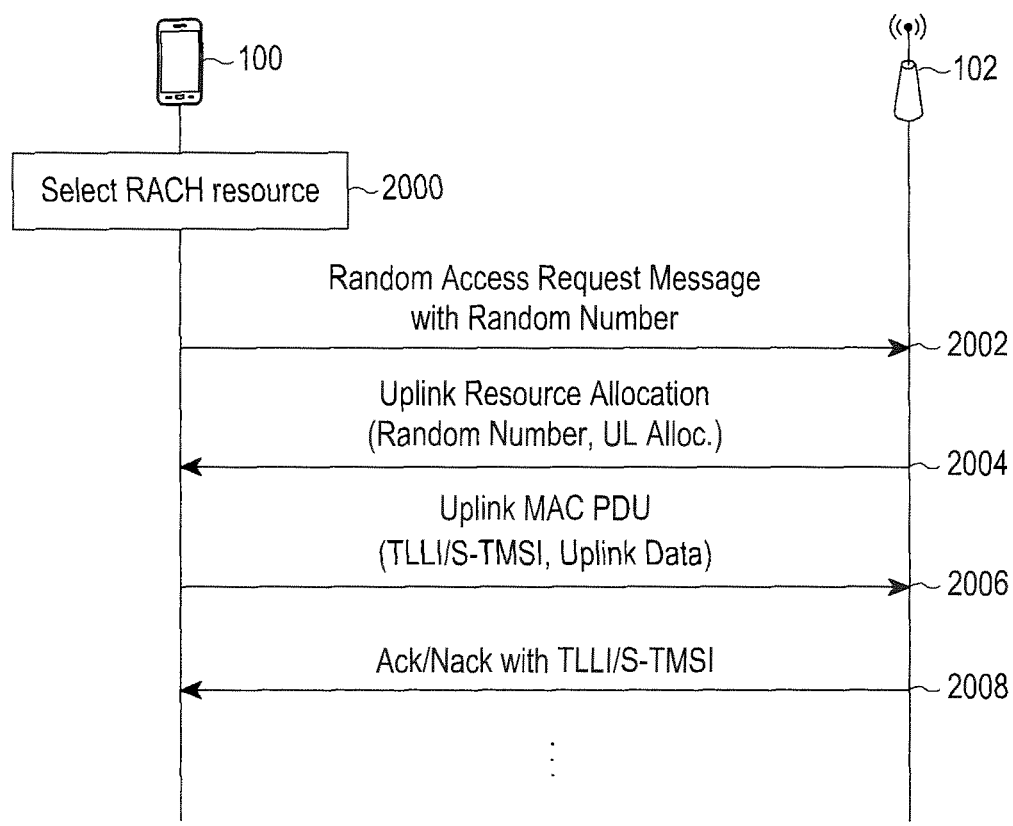
FIG. 20 is a view illustrating an example of a method in which a unique ID is used when an SPS UE requests an additional resource allocation according to the present disclosure.

FIG. 20 is a view illustrating an example of a method in which a unique ID is used when an SPS UE requests an additional resource allocation according to the present disclosure.

Although the method shown in FIG. 20 is similar to the UE trigger scheme connection method, the SPS UE request through a random access request message or UL MAC PDU might not be made. That is, the UE may request supplemental resource assignment by abstaining from a separate explicit SPS UE request. Or, as necessary, the UE 100 may use a normal SPS indicator in the random access request message.

The SPS UE 100 requesting the supplemental resource assignment may select a RACH resource (2000) and newly transmit a random access request message using the selected RACH resource (2002). In response to the random access request message 2002, the UE 100 may receive UL resource allocation information containing the random number and send the UL MAC PDU using the assigned UL resource (2008). The UL MAC PDU may contain the unique ID of the UE 100. The UE may receive an ACK/NACK responsive to the UL MAC PDU 2006.

Figure 21:
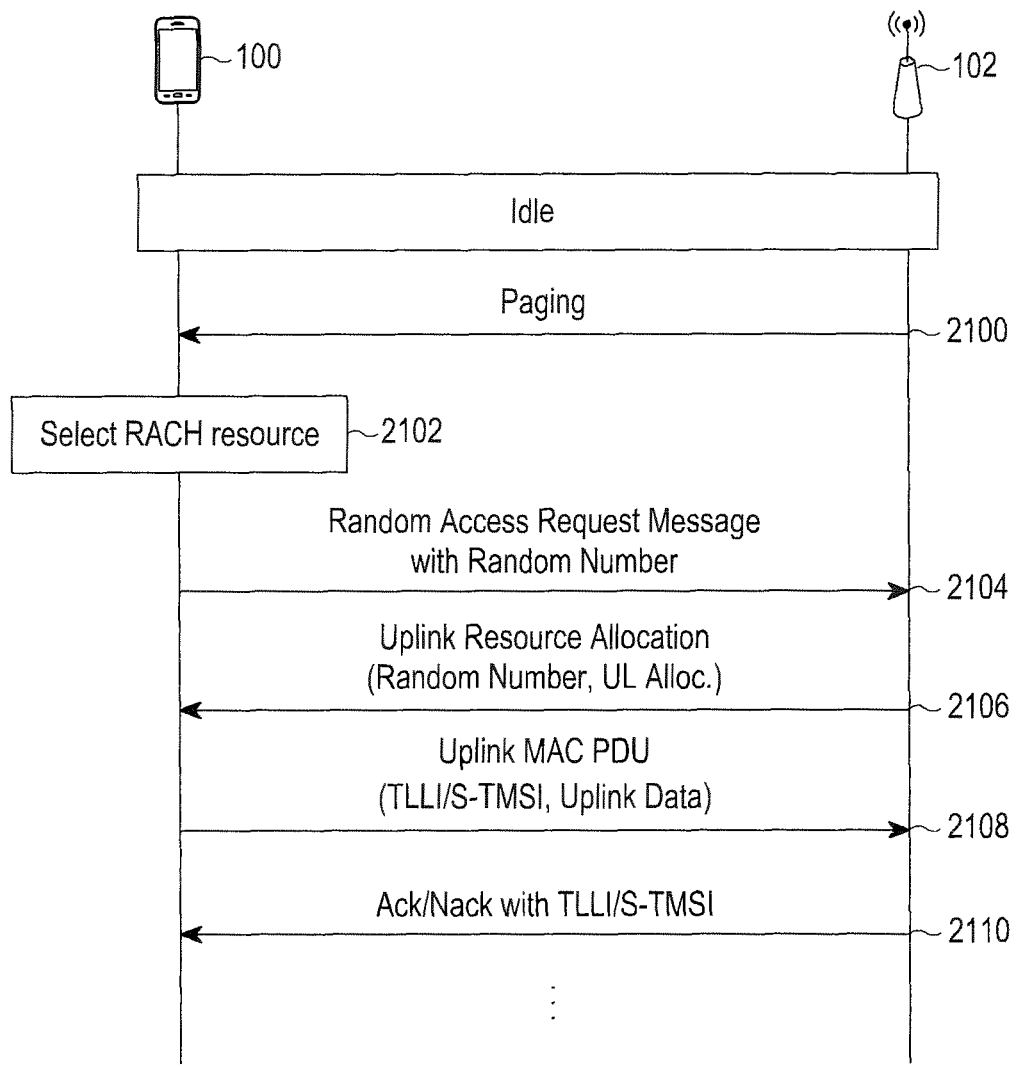
FIG. 21 is a view illustrating an example of a method in which a unique ID is used when a base station instructs an additional resource allocation according to the present disclosure.

FIG. 21 is a view illustrating an example of a method in which a unique ID is used when a base station instructs an additional resource allocation according to the present disclosure.

Operations 2102 to 2110 in FIG. 21 are the same as operations 2000 to 2008 in FIG. 20, and thus, no detailed description thereof is given. In FIG. 21, however, the base station may signify that the resource allocation is not an SPS resource reconfiguration but supplemental resource assignment by waking the UE 100 up out of the idle state and then transmitting a one-bit indicator in the control channel in the resource allocation process 2106.

SPS Release

SPS release may be performed by the base station or UE.

Schemes by the base station may include: 1) an explicit release scheme of transmitting an indicator in a control channel; 2) an implicit release scheme of intentionally abstaining from transmission of an ACK/NACK; or 3) a scheme of transmitting a release message in DL data.

Schemes by the UE may include: 1) an explicit scheme of including an SPS release instruction through an access cause upon random access request; 2) an implicit scheme of transmitting no data; or 3) a scheme of transmitting a release message in SPS transmission data.

SPS ACK/NACK Transmission and Retransmission

ACK/NACK information transmission schemes for SPS transmission of UL data may include: 1) ACK/NACK bit-map-type transmission in an order previously designated between base station and UE in a control channel; or 2) transmission of ACK/NACK information along with a UE ID in a control channel. Further, retransmission schemes may include: 1) retransmission on a frequency channel of the recent transmission in a pre-designated time upon failure to receive an ACK/NACK after the initial transmission; 2) retransmission on a frequency channel of the recent transmission in a pre-designated time upon reception of a NACK; or 3) retransmission after being assigned a UL resource for dynamic retransmission through a control channel after UL data SPS transmission.

SPS Interval

An SPS interval group (type of SPS intervals available) may be transferred as system information. The SPS interval proposed in this disclosure is from a start point to an end point.

The start point of the SPS interval may be determined as follows.

First start time type 1: Control channel transmission time of assignment of a resource for first UL data after the UE's initial attachment upon connection between base station and UE designated as SPS UE (where the SPS configuration is achieved from the UE or base station)

First start time type 2 (valid only for the case where SPS-C-RNTI is assigned upon SPS configuration among the cases of the base station trigger scheme):

Where the time of performing the first SPS is designated upon SPS configuration, the time of transmission of control channel intended for resource reconfiguration before the first SPS is performed (which is designated regardless of whether the UE receives the control channel and whether the control channel is indeed sent to the UE)

Other start points: End point of SPS interval

The end point of the SPS interval may be determined to be the time of transmission of control channel intended for resource reconfiguration before the next SPS transmission (which is designated irrespective of whether the UE receives the control channel or whether the control channel is actually sent to the UE).

Further, where the SPS intervals of all UEs are the same, the SPS interval may be transmitted through system information.

The start point and end point of the SPS interval are described with reference to FIGS. 22 to 24.

Figure 22:
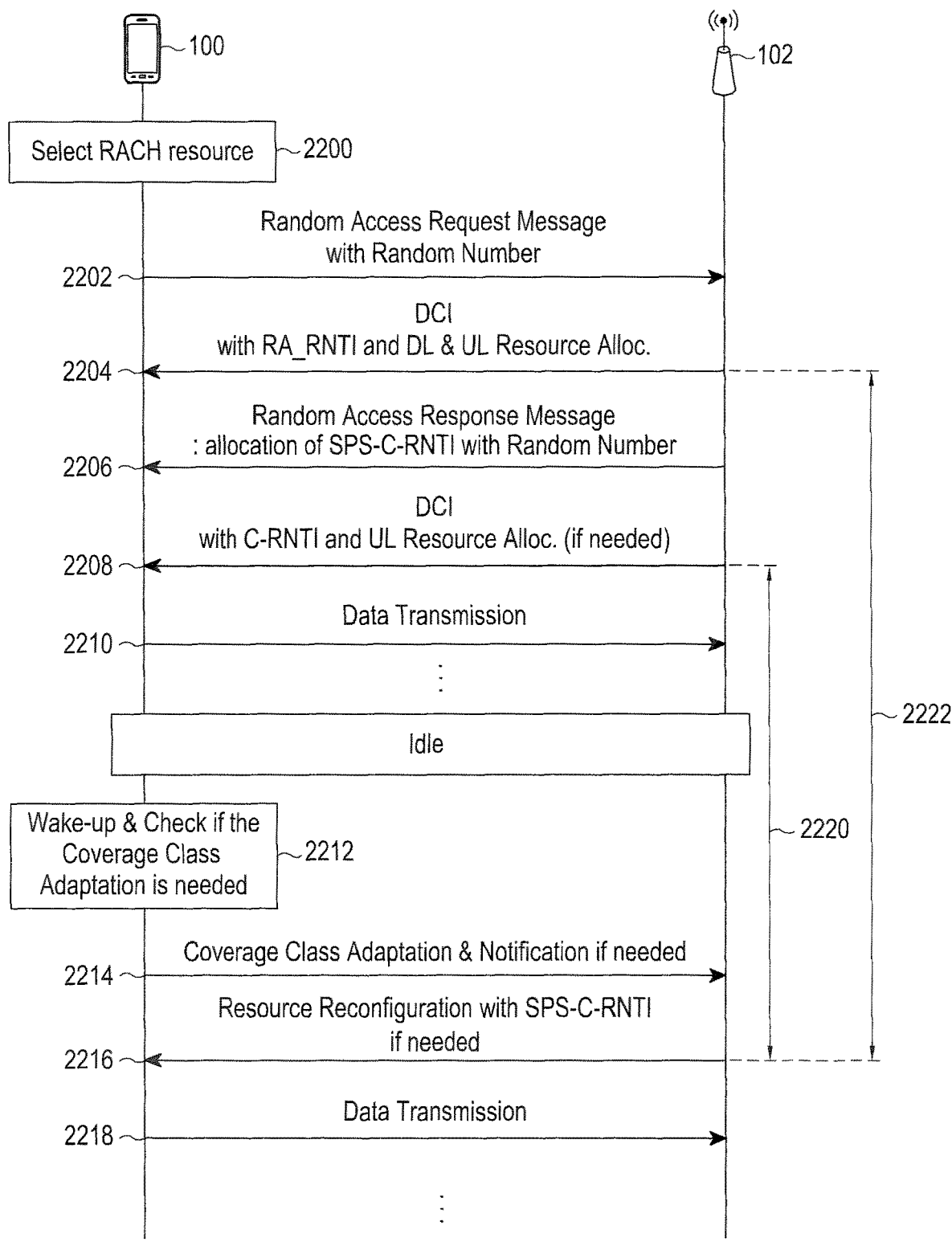
FIG. 22 is a view illustrating an SPS interval in a method where an SPS UE ID is used when an SPS UE requests a resource reconfiguration according to the present disclosure.

FIG. 22 is a view illustrating an SPS interval in a method where an SPS UE ID is used when an SPS UE requests a resource reconfiguration according to the present disclosure.

The UE 100 may select a RACH resource for transmission of the random access request message (2200). The UE 100 may transmit the random access request message to the base station 102 using the selected RACH resource (2202). The random access request message 2202 may contain the random number. In response to the random access request message 2202, the base station 102 may transmit, to the UE 100, a DCI containing DL & UL resource allocation information and RA-RNTI (2204). When the random access request transmitted from the UE 100 succeeds, the base station 102 may assign the SPS-C-RNTI to the UE 100 and transfer the same through a random access response message (2206). The random access response message may further include the random number transmitted from the UE 100. Subsequently, the base station 102 may transmit, to the UE 100, a DCI including an SPS-C-RNTI and UL resource allocation information for SPS transmission (2208). The UE 100 performs SPS transmission of UL data through the assigned UL resource (2210). The UE 100 used to be in the idle state wakes up before the next SPS transmission 2218 to check its CC (2212). Where the CC of the UE 100 is changed, the UE 100 may notify the base station 102 of the changed CC (2214), and in response, the UE 100 may receive a resource reconfiguration 2216.

Here, there may be two SPS intervals: a first SPS interval 2222 and a second SPS interval 2220. The start point of the first SPS interval 2222 may be the time 2204 of reception of the DCI containing the RA-RNTI and DL & UL resource allocation information, and the start point of the second SPS interval 2220 may be the time 2208 of reception of DCI containing the UL resource allocation information for SPS transmission. The end point of the firs and second SPS interval may be the time 2216 of reception of the reconfiguration of the next SPS resource.

Figure 23:
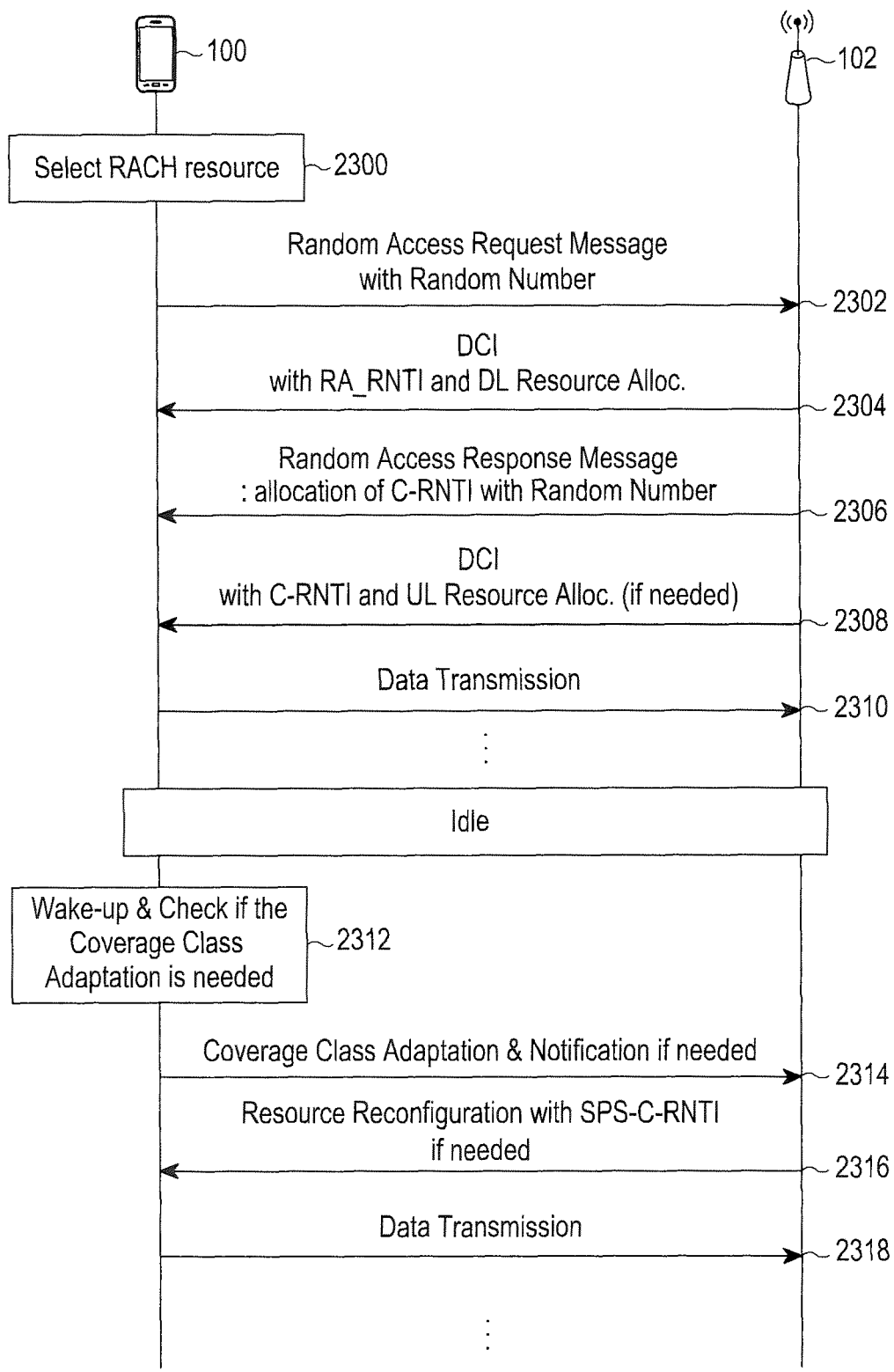
FIG. 23 is a view illustrating an SPS interval in a method where an SPS UE ID is used when a base station instructs a resource reconfiguration according to the present disclosure.

FIG. 23 is a view illustrating an SPS interval in a method where an SPS UE ID is used when a base station instructs a resource reconfiguration according to the present disclosure.

The UE 100 may select a RACH resource for transmission of the random access request message (2300). The UE 100 may transmit the random access request message to the base station 102 using the selected RACH resource (2302). The random access request message may include the random number. In response to the random access request message 2302, the base station 102 may transmit, to the UE 100, a DCI containing DL resource allocation information and RA-RNTI (2304). When the random access request transmitted from the UE 100 succeeds, the base station 102 may assign the C-RNTI to the UE 100 and transfer the same through a random access response message (2306). The random access response message may further include the random number transmitted from the UE 100. Subsequently, the base station 102 may transmit, to the UE 100, a DCI including a C-RNTI and UL resource allocation information for UL data transmission (2308). The UE 100 may perform UL data transmission using the UL resource allocation information (2310). The UE 100 performs SPS transmission of UL data through the assigned UL resource (2310). The UE 100 used to be in the idle state wakes up before the next SPS transmission 2318 to check its CC (2312). Where the CC of the UE 100 is changed, the UE 100 may notify the base station 102 of the changed CC (2314), and in response, the UE 100 may receive a resource reconfiguration 2316.

Here, the start point oif the SPS interval may be the time 2316 of reception of the resource reconfiguration, and the end point of the SPS interval may be the time 2216 of reception of the reconfiguration of the next SPS resource or the end point of the SPS interval.

Figure 24:
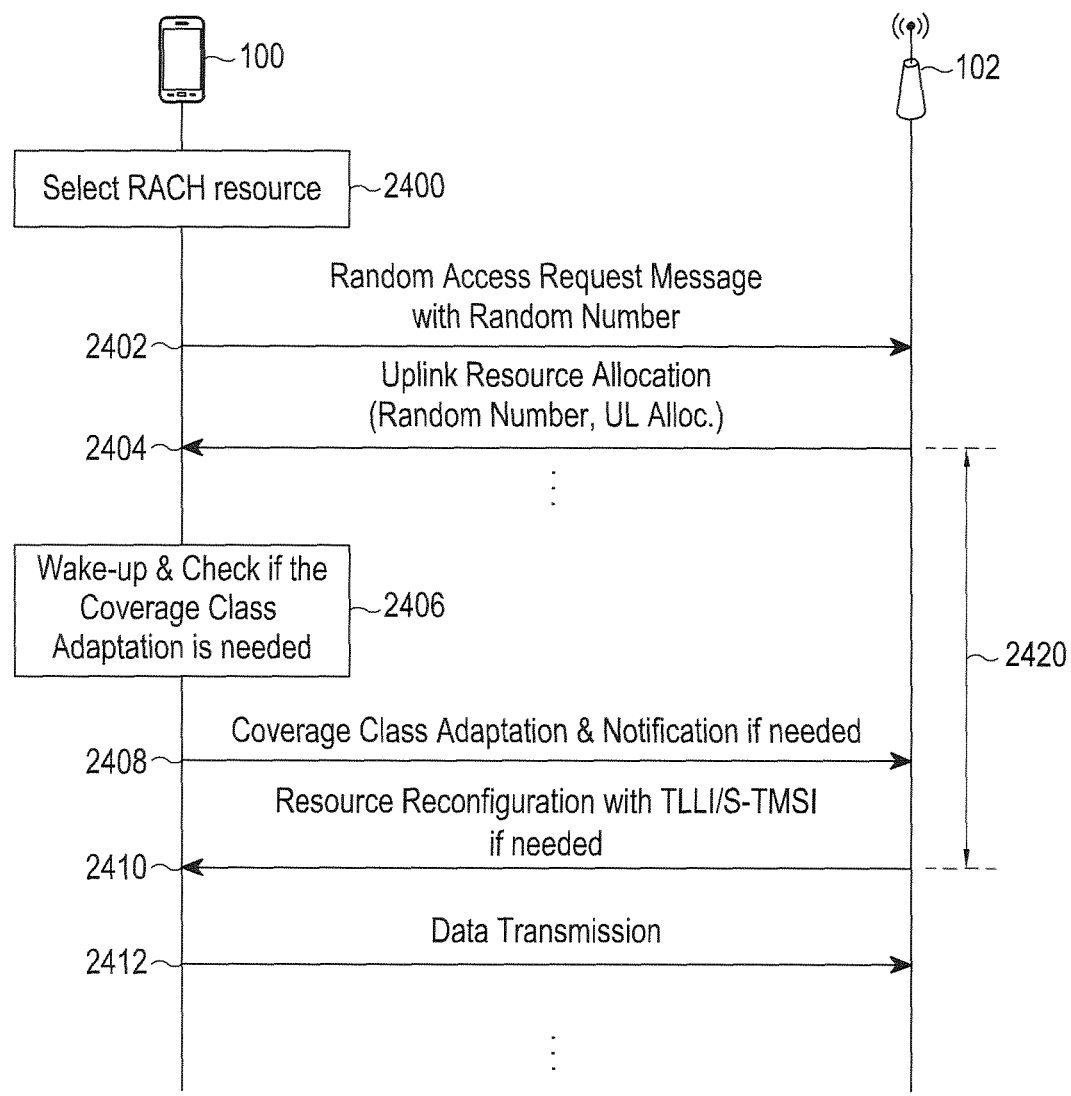
FIG. 24 is a view illustrating an SPS interval in a method where a unique ID is used when an SPS UE requests a resource reconfiguration according to the present disclosure.

FIG. 24 is a view illustrating an SPS interval in a method where a unique ID is used when an SPS UE requests a resource reconfiguration according to the present disclosure.

The UE 100 may select a RACH resource for transmission of the random access request message (2400). The UE 100 may transmit the random access request message to the base station 102 using the selected RACH resource (2402). The random access request message may include the random number. In response to the random access request message 2402, the base station 102 may transmit, to the UE 100, UL resource allocation information for UL transmission (2404). The UE 100 used to be in the idle state wakes up before the next SPS transmission 2412 to check its CC (2406). Where the CC of the UE 100 is changed, the UE 100 may notify the base station 102 of the changed CC (2408), and in response, the UE 100 may receive a resource reconfiguration 2410.

Here, the start point of the SPS interval 2420 may be the time 2404 of reception of the UL resource allocation information, and the end point of the SPS interval 2420 may be the time 2410 of reception of the reconfiguration of the next SPS resource or the end point of the SPS interval.

Figure 25:
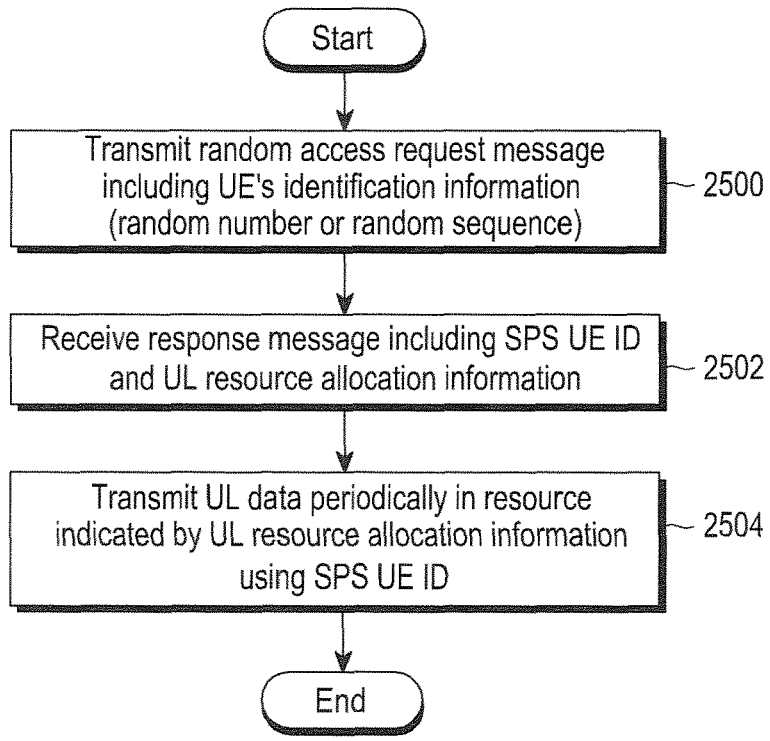
FIG. 25 is a view illustrating an SPS communication method by a UE according to the present disclosure.

FIG. 25 is a view illustrating an SPS communication method by a UE according to the present disclosure.

The UE transmits a random access request message containing the UE's identification information to the base station (2500). The UE's identification information is information indicating that the UE is to be designated as SPS UE, and the input electrode may be, e.g., a random number or random sequence. The random number or random sequence may be a value selected from a group differentiated for the SPS UE. The random access request message may further contain an access cause indicating an SPS request.

In response to the random access request message, the UE receives a response message containing an SPS UE ID and UL transmission resource information (2502). The response message may be a random access response message or a contention resolution message. The SPS UE ID may be an SPS-C-RNTI.

The UE periodically sends UL data in the UL resource indicated by the UL resource allocation information using the SPS UE ID (2504).

Selectively, the UE may transmit a random access request message containing the SPS-C-RNTI to the base station to request a resource reconfiguration and receive the resource reconfiguration. The UE may perform periodic transmission of UL data using the resource indicated in the resource reconfiguration.

Selectively, the UE may transmit a random access request message for supplemental resource assignment to the base station, and in response, the UE may receive a random access response message containing a C-RNTI. The UE may transmit UL data in the supplementally assigned resource using the UL resource information and the random access response message containing the C-RNTI.

Figure 26:
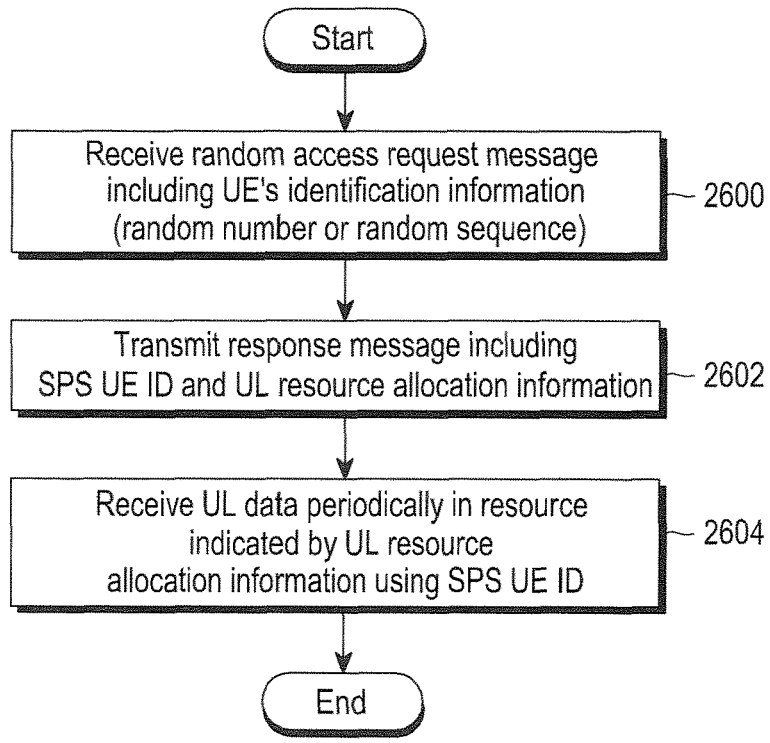
FIG. 26 is a view illustrating an SPS communication method by a base station according to the present disclosure.

FIG. 26 is a view illustrating an SPS communication method by a base station according to the present disclosure.

The base station receives a random access request message containing the UE's identification information (2600). The UE's identification information is information indicating that the UE is to be designated as SPS UE, and the input electrode may be, e.g., a random number or random sequence. The random number or random sequence may be a value selected from a group differentiated for the SPS UE. The random access request message may further contain an access cause indicating an SPS request.

In response to the random access request message, the base station transmits, to the UE, a response message containing an SPS UE ID and UL transmission resource information (2602). The response message may be a random access response message or a contention resolution message. The SPS UE ID may be an SPS-C-RNTI.

The base station periodically receives UL data in the UL resource indicated by the UL resource allocation information using the SPS UE ID (2604).

Selectively, the base station may receive, from the UE, a random access request message containing the SPS-C-RNTI, and in response to the random access request message, send a resource reconfiguration message. The base station may perform periodic reception of UL data using the resource indicated in the resource reconfiguration.

Selectively, the base station may receive a random access request message for supplemental resource assignment from the UE, and in response, the base station may transmit a random access response message containing a C-RNTI. The base station may receive UL data in the supplementally assigned resource using the UL resource information and the random access response message containing the C-RNTI.

Figure 27:
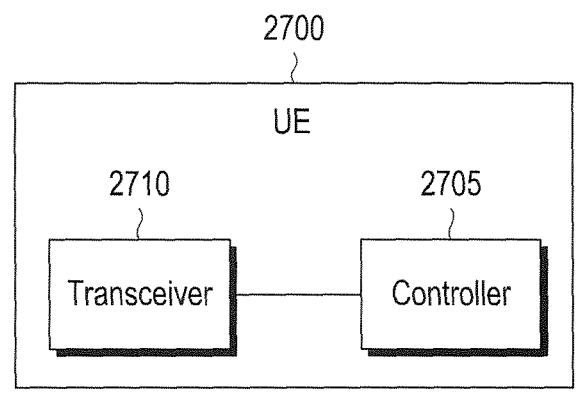
FIG. 27 is a view schematically illustrating a configuration of a UE device according to the present disclosure.

FIG. 27 is a view schematically illustrating a configuration of a UE device according to the present disclosure.

The UE 2700 may include a transceiver 2710 performing data transmission and reception with the base station and a controller 2705 controlling all of the operations of the UE 2700. The operations of the UE as described above may be appreciated as performed under the control the controller 2705. However, the controller 2705 and the transceiver 2710 are not necessarily implemented as separate devices, respectively, but may be implemented in a single configuration unit in the form of, e.g., a single chip.

Figure 28:
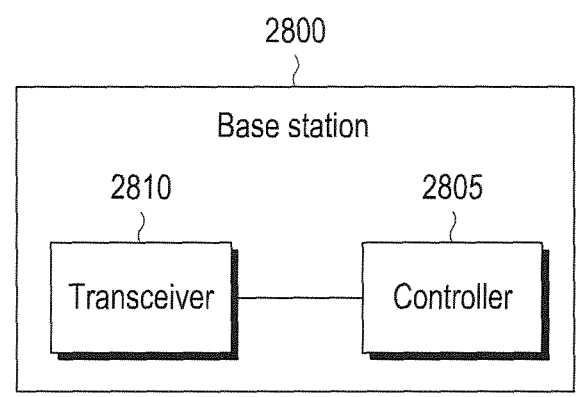
FIG. 28 is a view schematically illustrating a configuration of a base station device according to the present disclosure.

FIG. 28 is a view schematically illustrating a configuration of a base station device according to the present disclosure.

The base station 2800 may include a transceiver 2810 performing data transmission and reception with the UE and a controller 2805 controlling all of the operations of the base station 2800. The operations of the base station as described above may be appreciated as performed under the control the controller 2805. However, the controller 2805 and the transceiver 2810 are not necessarily implemented as separate devices, respectively, but may be implemented in a single configuration unit in the form of, e.g., a single chip.

It should be noted that the system configurations or examples of communication schemes exemplified in connection with FIGS. 1 to 28 are not intended to limit the scope of the present disclosure. In other words, all the components or operational steps illustrated in FIGS. 1 to 28 should not be construed as essential components to practice the present disclosure, and the present disclosure may be rather implemented with only some of the components without departing from the gist of the present disclosure.

The above-described operations may be realized by equipping a memory device retaining their corresponding codes in the base station device of the communication system or any component of the UE device. That is, the controller in the base station or UE device may execute the above-described operations by reading and running the program codes stored in the memory device by a processor or central processing unit (CPU).

As described herein, various components or modules in the UE or base station device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for communicating by a user equipment (UE) with a base station in a wireless communication system, the method comprising:
   transmitting a first random access request message including identification information of the UE to the base station, wherein the identification information of the UE comprises a random number indicating that the UE is to be designated as a semi-permanent scheduling (SPS) UE;
   receiving a response message including an SPS UE identity (ID) associated with the random number and information for allocation of an uplink (UL) resource for SPS transmission as a response to the first random access request message;
   transmitting UL data on the UL resource;
   transmitting a second random access request message including the SPS UE ID to the base station;
   receiving a resource reconfiguration message including the SPS UE ID; and
   transmitting UL data on a resource indicated by the resource reconfiguration message,
   wherein the random number is selected from a random number group comprising at least one random number available to the SPS UE.

2. The method of claim 1, wherein the identification information of the UE included in the first random access request message comprises a random sequence selected from a random sequence group comprising at least one random sequence available to the SPS UE.

3. The method of claim 1, wherein the response message comprises a random access response message, and wherein the SPS UE ID comprises a SPS-cell-radio network temporary identity (SPS-C-RNTI).

4. The method of claim 1, wherein the response message comprises a contention resolution message, and wherein the SPS UE ID comprises an SPS-C-RNTI.

5. The method of claim 1, further comprising:
   transmitting a third random access request message including the identification information of the UE to the base station;
   receiving a response message including a cell-radio network temporary identity (C-RNTI) and UL resource allocation information as a response to the third random access request message; and
   transmitting UL data on a resource indicated by the UL resource allocation information based on the C-RNTI.

6. A method for communicating by a base station with a user equipment (UE) in a wireless communication system, the method comprising:
   receiving a first random access request message including identification information of the UE, wherein the identification information of the UE comprises a random number indicating that the UE is to be designated as a semi-permanent scheduling (SPS) UE;
   transmitting a response message including an SPS UE identity (ID) associated with the random number and information for allocation of an uplink (UL) resource for SPS transmission, as a response to the first random access request message;
   receiving UL data on the UL resource based on the SPS UE ID;
   receiving a second random access request message including the SPS UE ID;
   transmitting a resource reconfiguration message including the SPS UE ID; and
   receiving UL data on a resource indicated by the resource reconfiguration message,
   wherein the random number is selected from a random number group comprising at least one random number available to the SPS UE.

7. The method of claim 6, wherein the identification information of the UE included in the first random access request message comprises a random sequence selected from a random sequence group comprising at least one random sequence available to the SPS UE.

8. A user equipment (UE) communicating with a base station in a wireless communication system, the UE comprising:
   a controller configured to control a transceiver; and
   the transceiver configured to:
      transmit a first random access request message including identification information of the UE to the base station, wherein the identification information of the UE comprises a random number indicating that the UE is to be designated as a SPS UE;
      receive a response message including an SPS UE identity (ID) associated with the random number and information for allocation of an uplink (UL) resource for SPS transmission as a response to the first random access request message;
      transmit UL data on the UL resource;
      transmit a second random access request message including the SPS UE ID to the base station;
      receive a resource reconfiguration message including the SPS UE ID; and
      transmit UL data on a resource indicated by the resource reconfiguration message,
   wherein the random number is selected from a random number group comprising at least one random number available to the SPS UE.

9. The UE of claim 8, wherein the identification information of the UE included in the first random access request message comprises a random sequence selected from a random sequence group comprising at least one random sequence available to the SPS UE.

10. The UE of claim 8, wherein the response message comprises a random access response message, and wherein the SPS UE ID comprises a SPS-cell-radio network temporary identity (SPS-C-RNTI).

11. The UE of claim 8, wherein the response message comprises a contention resolution message, and wherein the SPS UE ID comprises a SPS-cell-radio network temporary identity (SPS-C-RNTI).

12. The UE of claim 8, wherein the transceiver is further configured to:
   transmit a third random access request message including the identification information of the UE to the base station;
   receive a response message including a cell-radio network temporary identity (C-RNTI) and UL resource allocation information as a response to the third random access request message; and
   transmit UL data on a resource indicated by the UL resource allocation information based on the C-RNTI.

13. A base station communicating with a user equipment (UE) in a wireless communication system, the base station comprising:
   a controller configured to control a transceiver; and
   the transceiver configured to:
      receive a first random access request message including identification information of the UE, wherein the identification information of the UE comprises a random number indicating that the UE is to be designated as a SPS UE;
      transmit a response message including an SPS UE identity (ID) associated with the random number and information for an uplink (UL) resource for SPS transmission, as a response to the first random access request message;
      receive UL data on the UL resource based on the SPS UE ID;
      receive a second random access request message including the SPS UE ID;
      transmit a resource reconfiguration message including the SPS UE ID; and
      receive UL data on a resource indicated by the resource reconfiguration message,
   wherein the random number is selected from a random number group comprising at least one random number available to the SPS UE.

14. The base station of claim 13, wherein the identification information of the UE included in the first random access request message comprises a random sequence selected from a random sequence group comprising at least one random sequence available to the SPS UE.

* * * * *